United States Patent
Yoshida et al.

(10) Patent No.: US 7,929,016 B2
(45) Date of Patent: Apr. 19, 2011

(54) MONITORING SYSTEM, MONITORING METHOD AND CAMERA TERMINAL

(75) Inventors: Atsushi Yoshida, Osaka (JP); Katsuji Aoki, Nara (JP); Shoichi Araki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1223 days.

(21) Appl. No.: 10/592,386

(22) PCT Filed: Apr. 7, 2006

(86) PCT No.: PCT/JP2006/307480
§ 371 (c)(1),
(2), (4) Date: Sep. 12, 2006

(87) PCT Pub. No.: WO2006/132029
PCT Pub. Date: Dec. 14, 2006

(65) Prior Publication Data
US 2009/0262195 A1 Oct. 22, 2009

(30) Foreign Application Priority Data
Jun. 7, 2005 (JP) ................................. 2005-167561

(51) Int. Cl.
*H04N 7/18* (2006.01)
*H04N 5/228* (2006.01)

(52) U.S. Cl. ............... 348/159; 348/222.1; 348/E7.085; 348/E5.031

(58) Field of Classification Search .................... 348/159
See application file for complete search history.

(56) References Cited

U.S. PATENT DOCUMENTS

| 6,101,536 | A * | 8/2000 | Kotani et al. ................. 709/217 |
| 6,727,938 | B1* | 4/2004 | Randall ......................... 348/143 |
| 6,812,835 | B2 | 11/2004 | Ito et al. |
| 6,848,087 | B2* | 1/2005 | Sengupta et al. ................. 716/4 |
| 2002/0135483 | A1* | 9/2002 | Merheim et al. ........... 340/573.1 |
| 2005/0212909 | A1* | 9/2005 | Takehara et al. ................. 348/36 |
| 2005/0259158 | A1* | 11/2005 | Jacob et al. ................ 348/218.1 |

FOREIGN PATENT DOCUMENTS

| JP | 7-303207 | 11/1995 |
| JP | 10-229511 | 8/1998 |
| JP | 2000-083243 | 3/2000 |
| JP | 3043925 | 3/2000 |
| JP | 2001-094975 | 4/2001 |
| JP | 2001-245284 | 9/2001 |
| JP | 2001-251608 | 9/2001 |
| JP | 2004-072628 | 3/2004 |

* cited by examiner

*Primary Examiner* — Andy S. Rao
*Assistant Examiner* — Hee-Yong Kim
(74) *Attorney, Agent, or Firm* — Wenderoth, Lind & Ponack, L.L.P.

(57) ABSTRACT

A monitoring system is provided that thoroughly covers an area subject to monitoring, through shooting areas of plural camera terminals, while shooting with resolution according to distribution of importance for monitoring. The monitoring system includes camera terminals, each including a camera having a shooting area adjustment function, a camera controlling unit controlling an adjustment of the shooting area of the camera, a communication IF communicating with an other camera terminal, and a processing unit adjusting a resolution of the shooting area of the camera terminal by controlling the camera via the camera controlling unit to reduce a difference between a weighted resolution of the shooting area of the camera terminal and a weighted resolution of shooting area of the other camera terminal based on information regarding the shooting area of the other camera terminal obtained through the communication IF.

12 Claims, 36 Drawing Sheets

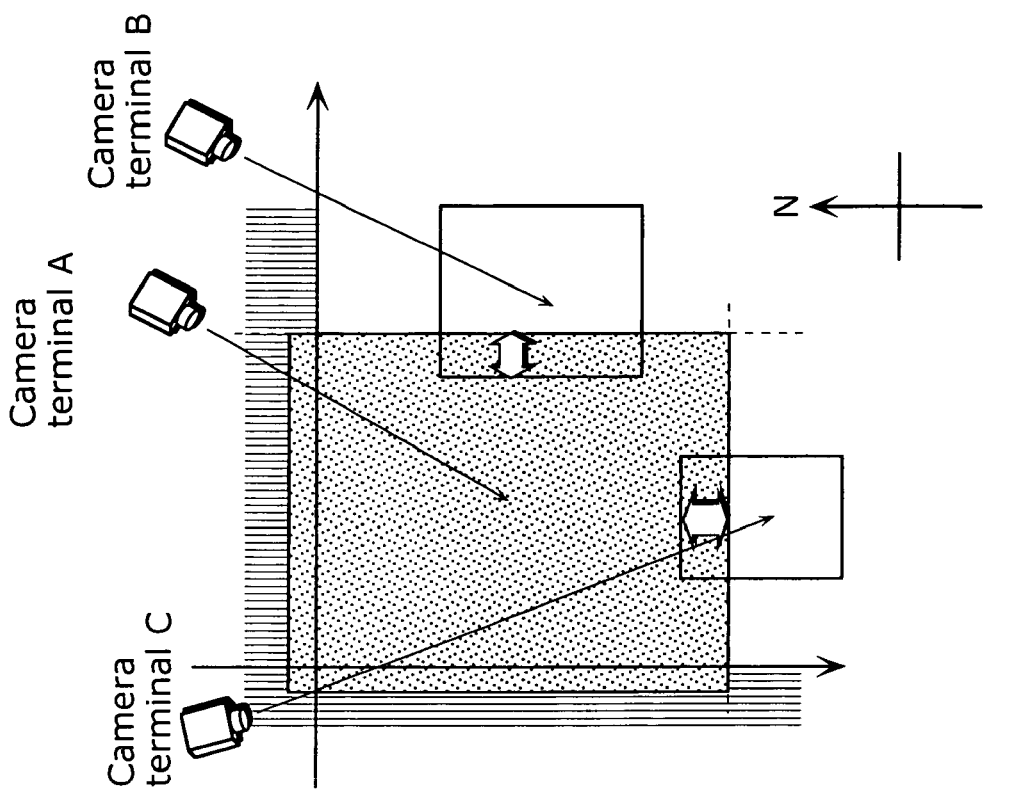
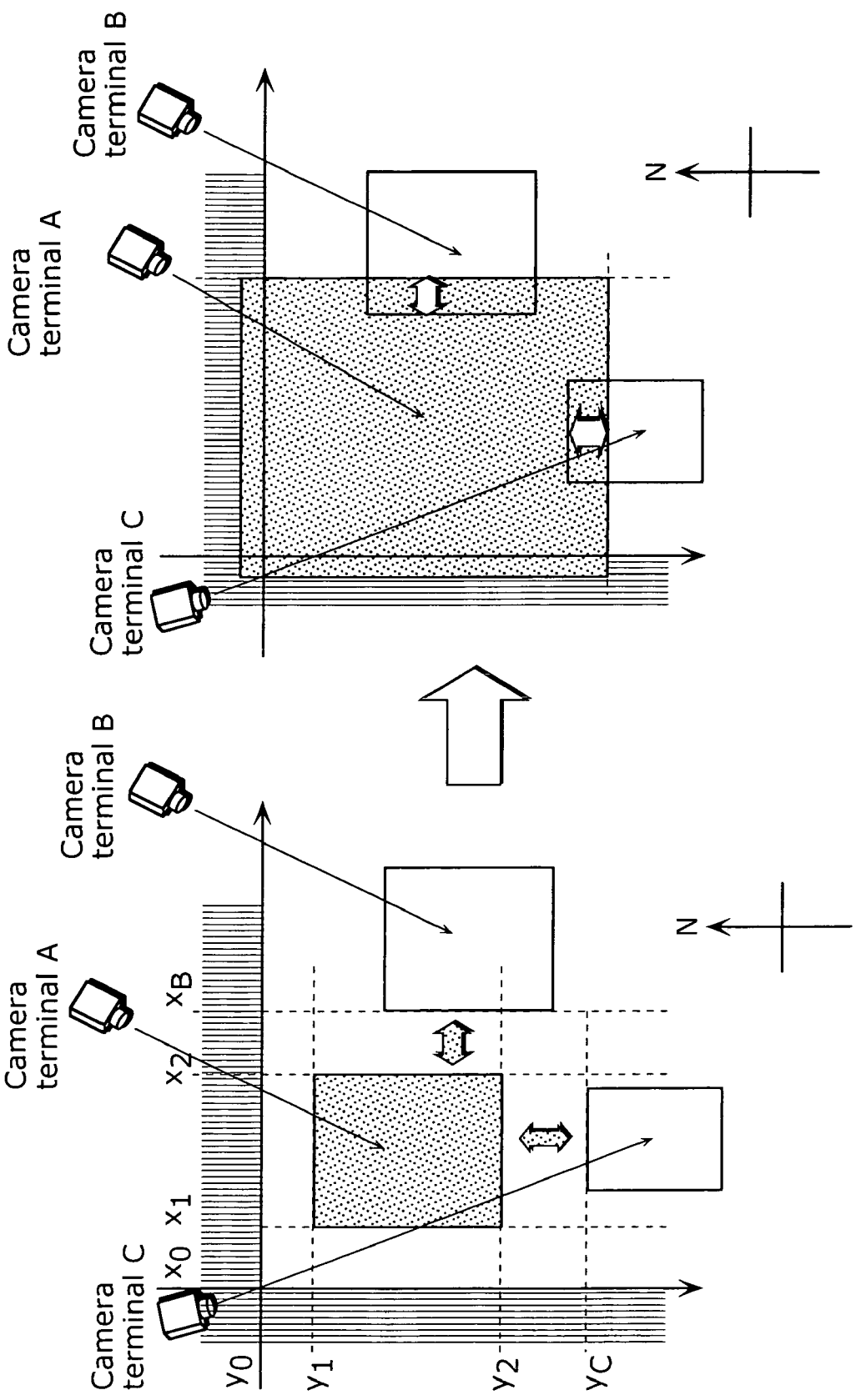

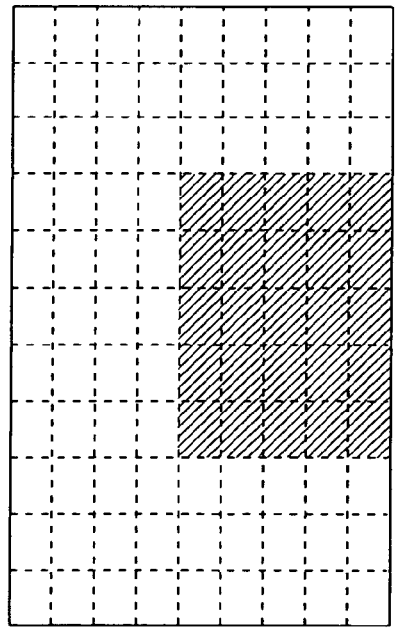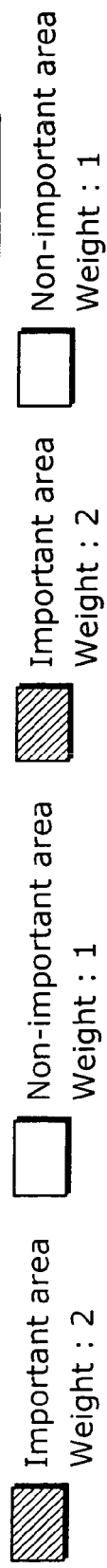
FIG. 19A Map 001
FIG. 19B Map 002
FIG. 19C Resolution weight selection list 124
| Decision condition | Resolution weight map number |
|---|---|
| Time:7:00~19:00 | Map 001 |
| Time:19:00~7:00 | Map 002 |

FIG. 23C
| Template image list 126 | |
|---|---|
| Template image | Resolution weight |
| Template 001 | 4 |
| Template 002 | 2 |
| When above template is not displayed on screen | 1 |
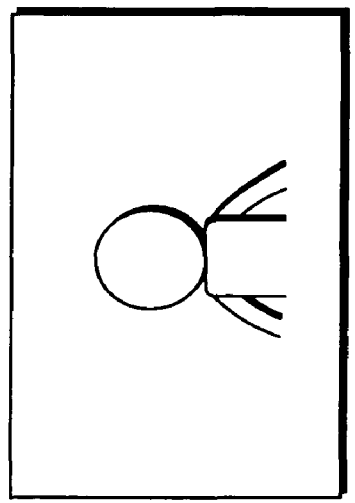
FIG. 23A
Template image 125
Template 001
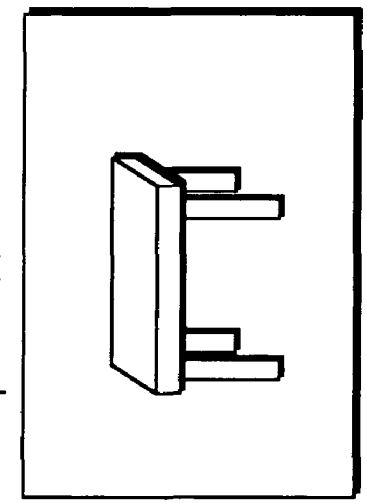
FIG. 23B
Template 002

FIG. 27

Resolution weight map creating rule 127

| Rule | Resolution weight |
|---|---|
| Location where the template 001 object exists in the image for 80% or more of time in the last 5 minutes. | 2 |
| Location where there is the template 001 object in the image for less than 80% of time in the last 5 minutes. | 1 |
| ... | ... |

FIG. 29
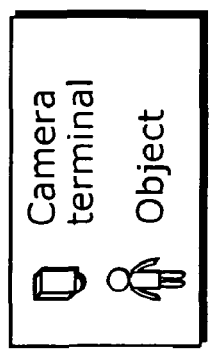
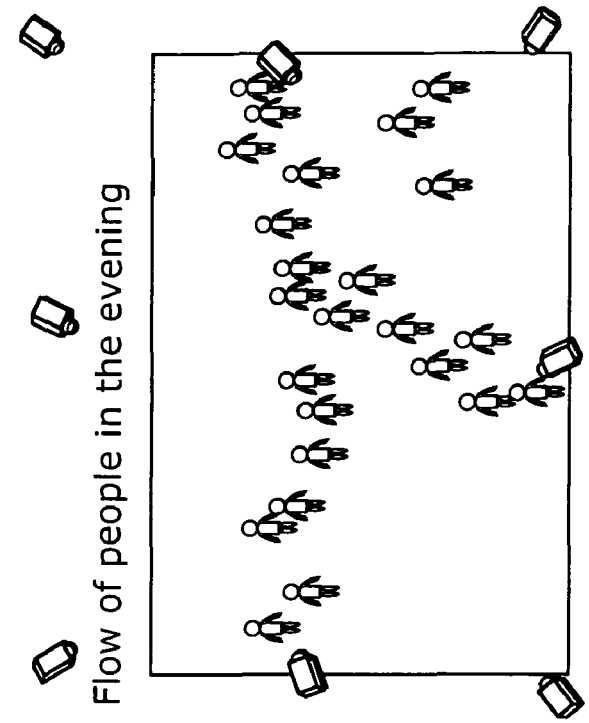
Flow of people in the evening
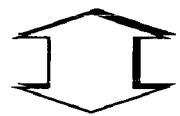
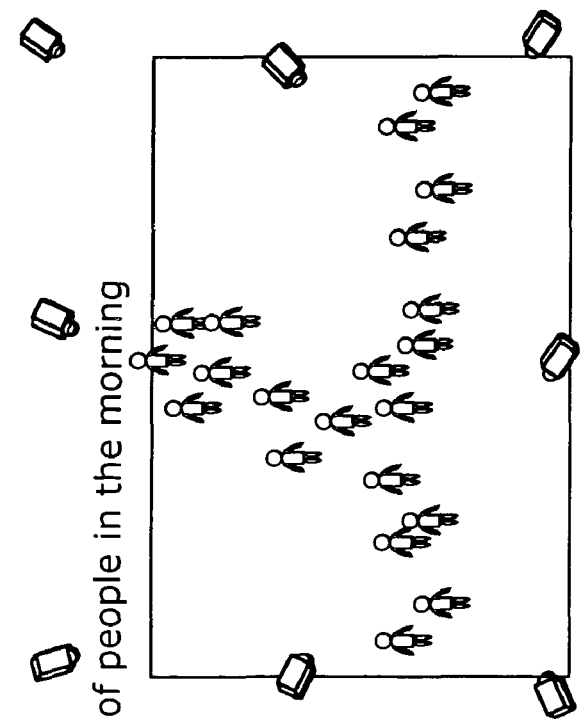
Flow of people in the morning
Conditions in the area subject to surveillance shot by a plural number of cameras

FIG. 33A

Preset information 128

| Preset number | Camera 1 | | | Camera 2 | | | ... |
| --- | --- | --- | --- | --- | --- | --- | --- |
| | Pan | Title | Focus | Pan | Title | Focus | |
| Preset 001 | 0° | 0° | 2.0mm | 0° | 0° | 2.0mm | ... |
| Preset 002 | 10° | -10° | 2.5mm | -10° | 10° | 2.5mm | ... |
| Preset 003 | 13° | 24° | -1.5mm | 12° | -34° | 2.5mm | ... |
| ... | ... | ... | ... | ... | ... | ... | ... |

FIG. 33B

Preset selection list 129

| Decision condition | Resolution weight number |
| --- | --- |
| Time: 6:00~14:00 | Preset 001 |
| Time: 14:00~22:00 | Preset 002 |
| Time: 22:00~6:00 | Preset 003 |
| | |

MONITORING SYSTEM, MONITORING METHOD AND CAMERA TERMINAL

BACKGROUND OF THE INVENTION

1. Field of Invention

The present invention relates to a monitoring system composed of plural cameras that can adjust a shooting area through pan, tilt, and zooming control, and so on, and especially relates to a monitoring system that shoots with resolution according to distribution of importance for monitoring, while allowing shooting an entire area subject to monitoring at the same time.

2. Description of the Related Art

In recent years, research and development have been actively taking place for a monitoring system using plural cameras, mainly targeting for surveillance as an intended purpose. For monitoring with plural cameras, two requirements must be satisfied: (Requirement 1) to reduce areas, which become a blind spot, as much as possible, in an area subject to monitoring (an area targeted for monitoring), and (Requirement 2) to acquire as much detailed shooting information as possible for an important area within the monitoring area.

Among conventional devices using plural cameras, there is a mobile object detection deciding device, as a representative conventional device shown in patent literature 1, that uses a combination of a camera for shooting a wide range area and a camera for shooting a narrow range area in detail, which achieves above Requirements 1 and 2.

FIG. 1 is a diagram that shows a configuration of the mobile object detection deciding device of patent literature 1, in which (i) a detecting camera device 9010 shoots a detection object in a wider shooting range with a camera 9011 and a reflecting mirror 9012, (ii) a mobile object extracting unit 9013 extracts the detection object from a shot image, and (iii) a location information extracting unit 9014 obtains location information subject to detection in a wide detection area by extracting location information of the detection object. Also, a decision camera device 9020 obtains detailed information of the detection object by having a camera controlling unit 9022 control a rotation angle, a depression angle, and a zooming ratio of camera 9021 based on the location information of the detection object and shooting an enlarged image of the detection object. In this way, patent literature 1 discloses that a blind spot is eliminated by positioning the detecting camera device 9010, which simultaneously shoots all directions, in a manner such as in which hexagons showing its detection range are located next to each other, as shown in FIG. 2, and the decision camera device 9020 is controlled based on a location of the detection object detected by the detecting camera device 9010.

In addition, patent literature 2 aims at shooting a continuous wide range area such as a panoramic image (above Requirement 1) and discloses having a redundant part in a shooting area located next each other by using plural cameras that can control a convergence angle, and controlling the convergence angle of the cameras to keep the redundant area in a certain range. FIG. 3 is a drawing that shows a configuration of an imaging device described in patent literature 2. In FIG. 3, plural cameras, 2003a and 2003b, which shoot an object 2001, can shoot a wide range of area such as a panoramic image without creating a blind area between shooting areas of the plural number of cameras, by controlling a convergence angle for keeping a redundant area in a shooting range between cameras in a certain area with using shooting information from a plurality of pieces of image information obtained from the plural number of cameras, 2003a and 2003b through a convergence angle controlling unit 2021 that provides a discretional convergence angle to the plural number of cameras and imaging ratio information made available in advance in an optical parameter storage unit 2023.

Furthermore, using plural cameras that have a camera platform and a zooming control, patent literature 3 discloses that a camera, which zooms in to track some incursion object, transmits a request for scaling up a view to a camera that monitors an adjacent area, and further discloses that the camera receiving the request for scaling up the view controls to include an area normally covered by the camera tracking the object and an area normally covered by the self camera, so as to satisfy the above Requirement 1 and Requirement 2. FIG. 4 is a diagram that shows a configuration of an incursion object monitoring device described in patent literature 3. The incursion object monitoring device in patent literature 3 includes plural incursion object monitoring devices that switch between three types of shooting modes: a "normal" mode for monitoring a prescribed area, a "tracking" mode for tracking and shooting a incursion object, and a "wide-angle" mode for shooting an area assigned to a camera located next by extending a field angle. When an incursion object monitoring device among the plural incursion object monitoring devices set in the "normal" mode detects an incursion object through a process of differences in an image signal, it switches the mode from the "normal" mode to the "tracking" mode, and tracks the incursion object and shoots it in detail by controlling a zoom lens 3102 and controlling a platform of a camera 3101 through a camera platform controlling device 3105 and a zoom controlling device 3116 based on the information of the incursion object. Furthermore, through transmission of a view scale up request to other incursion object monitoring device that monitors other monitoring area next to the monitoring area where the incursion object is being tracked, an incursion object monitoring system that has received the request switches the mode from the "normal" mode to a "scale up" mode, controls the zoom lens 3102 and scales up a view of its monitoring range.

In this way, as shown in FIG. 5, when an incursion object 3610 appears at a location shown in FIG. 6 when a first incursion object monitoring device 3601 monitors a monitoring area 3603 and a second incursion object monitoring device 3602 monitors a monitoring area 3604, it seems that the second incursion object monitoring device 3602 can only monitor a part of the monitoring area 3604 and a blind spot is generated because its mode is switched to the "tracking" mode. However, by expanding the monitoring area 3603 of the first incursion object monitoring device 3601 (expanded monitoring area 3608) in the "wide-angle" mode, it covers the situation where the blind spot of second incursion object monitoring device 3602 is generated.

Additionally, in patent literature 4, a configuration is disclosed for the case where plural areas are divided and monitored by a set of camera, a direction and zooming of a camera corresponding to the plural of areas are preset, and plural presets for plural cameras are centrally controlled from a terminal. FIG. 7 is a diagram to show a configuration of a terminal camera unit described in patent literature 4. In FIG. 7, both of a TV camera 4021 and a lens unit 4022 of the terminal camera unit are controlled based on a command from a terminal controlling unit 4023 and an image signal is output. The terminal controlling unit 4023 makes the TV camera 4021 rotate in horizontal and vertical directions by providing a rotation command to a rotation unit 4024 that retains the TV camera 4021. Also, a preset unit 4025 belongs to the terminal controlling unit 4023, which memorizes plural pieces of combined information on directions of TV camera 4021 (horizontal and vertical directions) and functions (zooming and focusing) of the lens unit 4022 as rotation information and lens setup information, and automatically adjusts a direction of the TV camera 4021 view and a zooming value to designated values by certain rotation information and lens setup information designated through a controlling command from an external entity.

Also, FIG. 8 shows a configuration example of a monitoring system using the terminal camera unit illustrated in FIG. 7. In FIG. 8, a terminal camera units 4111, 4112, 4113, . . . are connected in parallel with a personal computer 4031 through a pair of transmission lines, which are a common monitoring line 4015 and a command line 4016, and the personal computer 4031 selects a discretional terminal camera unit from the plural terminal camera units, and centrally controls the terminal cameras 4111, 4112, 4113, . . . based on rotation information and lens setup information memorized in a preset unit. In this way, a user can easily zoom and monitor an area he wants to look at by selecting a preset necessary for a required camera.

Patent Reference 1: Patent Publication No. 3043925 (Pages 8 & 10, FIG. 1);
Patent Reference 2: Japanese Laid-Open Patent No. 7-303207 (Page 5, FIG. 1);
Patent Reference 3: Japanese Laid-Open Patent No. 2001-245284 (Pages 11, 12 and 17, FIGS. 1, 16 and 17); and
Patent Reference 4: Japanese Laid-Open Patent No. 10-229511 (Page 6, FIG. 3).

BRIEF SUMMARY OF THE INVENTION

However, in the above patent literatures 1 to 4, no consideration is necessarily taken to efficiently utilize all abilities (resolutions, and so on) of a camera. For example, there are issues that an area redundantly shot is bigger than needed, a certain level of resolution is not obtained, a resolution is decreased more than needed, and so on.

To be more specific, in the mobile object detection validating device, a shooting area of the detecting camera device is fixed to eliminate a blind spot. Therefore, if the number of the mobile object is increased and a validating camera device cannot shoot with prescribed resolution, it cannot flexibly handle the situation by having, for example, a detecting camera device shoot the object with high resolution. Moreover, as shown in FIG. 2, because the validating camera device redundantly shoots the area shot by the detecting camera device all the time, it cannot efficiently use an imaging material such as CCD.

Also, in the case of the imaging device in patent literature 2, it discloses that a redundant area is kept to a certain range to create a panoramic image by using plural cameras having an adjusting function of an convergence angle and a field angle. However, no consideration is taken to adjust a shooting area and resolution of each camera in the case a whole monitoring area including plural crucial monitoring areas where plural mobile objects exist are covered and monitored by plural cameras.

Also, in the case of the incursion object monitoring device in patent literature 3, to include a normal monitoring area of a camera switched to the "tracking" mode, it only discloses that a camera that shoots its adjacent area scales up its view. It does not consider any motions of each camera in the case plural mobile objects exist. Therefore, it is possible that a camera, which scales up a view to include normal monitoring areas for plural cameras that are in the "tracking" mode, may downgrade its resolution more than needed.

Also, just like a case of the monitoring system in patent literature 4, for the case a camera angle, zooming, and so on are preset by each camera to switch a location taken in an image and a zooming value according to a purpose, the preset work becomes more complicated as the number of cameras increases. In addition, the preset is not possible for a mobile object that makes irregular motions.

Therefore, for shooting a specific area subject to monitoring through plural camera terminals, the present invention aims at providing a monitoring system, a monitoring method and a camera terminal that set up resolution according to distribution of importance in the monitoring and its dynamic change, and adjust a shooting direction and resolution of all of the camera terminals to make an efficient shooting configuration with as few redundant shooting areas as possible (a combination of a shooting location and resolution of each camera) while shooting a whole area subject to monitoring.

In order to achieve the above objectives, the monitoring system related to the present invention is a monitoring system that monitors an area subject to monitoring including plural camera terminals having: a camera having a function for adjusting a shooting area; a camera controlling unit which controls adjustment of the shooting area of the camera; a communication interface for communicating with an other camera terminal; and a processing unit, in the case where weighted resolution is defined as a degree in which resolution of a highly important shooting area becomes high and resolution of a less important shooting area becomes low, which adjusts resolution of the shooting area of the self camera terminal by controlling the camera via the camera controlling unit to reduce a difference between the weighted resolution of the shooting area of the self camera terminal and the weighted resolution of the shooting area of the other camera terminal, based on information related to a shooting area of the other camera terminal obtained through the communication interface.

To be more specific, according to a first monitoring system of the present invention, in the case that a specific area subject to monitoring is shot by the number of camera terminals necessary or more than necessary to shoot its entire area, it is possible for the plural number of camera terminals to thoroughly shoot the area subject to monitoring, to conduct efficient monitoring with less overlapping areas, and also to execute monitoring with appropriate resolution according to importance by proving an "area subject to monitoring map" that defines a scope of the area subject to monitoring and a "resolution weight map" that defines resolution weight by each location within the area subject to monitoring to each camera terminal, having shooting areas located next each other be adjacent, and controlling camera terminals to have a fixed weighted resolution among adjacent camera terminals.

Also, according to a second monitoring system of the present invention, in the case a positioning pattern of a highly important area is changed, it is possible for the plural number of camera terminals to thoroughly shoot the area subject to monitoring, to conduct efficient monitoring with less overlapping areas, and also to execute monitoring with appropriately adjusted resolution according to the change in distribution of importance for monitoring by preparing plural common "resolution weight maps" for all of the camera terminals according to assumed positioning patterns without individually presetting each of the camera terminals, moreover defining a condition to select the "resolution weight map."

Additionally, according to a third monitoring system of the present invention, by defining importance of a location where a target object exists as resolution weight, it is possible for the plural number of camera terminals to thoroughly shoot the area subject to monitoring, to conduct efficient monitoring with less overlapping areas, and also to execute monitoring with appropriately adjusted resolution according to the change in distribution of importance due to existence of the specific target object.

Also, according to a fourth monitoring system of the present invention, even for an area subject to monitoring where the positioning patter for a highly important location cannot be predicted, as long as a rule to decide an area or a target object intended to be monitored in detail is provided, it is possible to automatically create "the resolution weight map" and its selection condition so that, even for a positioning patter of a highly important area, which is not assumed in advance, the plural number of camera terminals can thoroughly shoot the area subject to monitoring, conduct efficient monitoring with less overlapping areas, and also execute monitoring with appropriate resolution according to importance.

The present invention can be realized not only as such monitoring system, but also as a monitoring method having a processing means in the monitoring system as a step, a camera terminal composing the monitoring system, a program incorporated into a camera terminal, a recording media such as CD-ROM having its program recorded, and so on.

With the monitoring system of the present invention, it is possible to realize efficient and reliable monitoring since an area subject to monitoring is thoroughly covered by a shooting area of plural camera terminals and is shot with resolution adjusted accordingly to distribution of importance for monitoring and its dynamic changes.

Also, because the plural number of camera terminals composing the monitoring system adjust a location of a shooting area and resolution of a self camera terminal as each communicates with the other camera terminal in an autonomic and collaborated manner, locations and resolution in plural shooting areas are automatically adjusted even if a part of the camera terminals composing the monitoring system is broken, or some change occurs in the structure, e.g. addition of a new camera terminal. Consequently, the area subject to monitoring is thoroughly covered by shooting areas of the plural number of camera terminals and is shot with resolution adjusted accordingly to distribution of importance for monitoring and its dynamic changes.

In this way, because resolution of each camera terminal can be appropriately adjusted according to importance as the shooting areas among camera terminals are made to be adjacent to reduce any overlapping area while an entire predetermined area subject to monitoring is being shot, it is possible to efficiently monitor an important area with high resolution as well as eliminating any shooting failure in the area subject to monitoring. Therefore, for monitoring some public locations as a monitoring system for any suspicious people at schools, buildings, and so on, a wide-range shooting system at intersections, parks, and so on, or an indoor remote monitoring system that monitors a condition at how through plural network cameras, and so on, its practical value is high.

BRIEF DESCRIPTION OF DRAWINGS

FIGS. 16A and 16B explain motions of the camera in the first embodiment.
FIGS. 19A-19C show a data example that is memorized in a storage unit in the second embodiment 2.
FIGS. 23A-23C explain a controlling procedure of a camera terminal in the third embodiment.
FIG. 27 is a diagram to show a data example that is memorized in a storage unit in the fourth embodiment.
FIG. 29 is a diagram that explains motions of a camera terminal in the fourth embodiment.
FIGS. 33A and 33B show a data example that is memorized in a storage unit related to the present invention.

DETAILED DESCRIPTION OF THE INVENTION

First Embodiment

With reference to diagrams, the following explains best modes for carrying out the present invention.

At first, a configuration of a monitoring system in the first embodiment of the present invention is explains.

Figure 1:
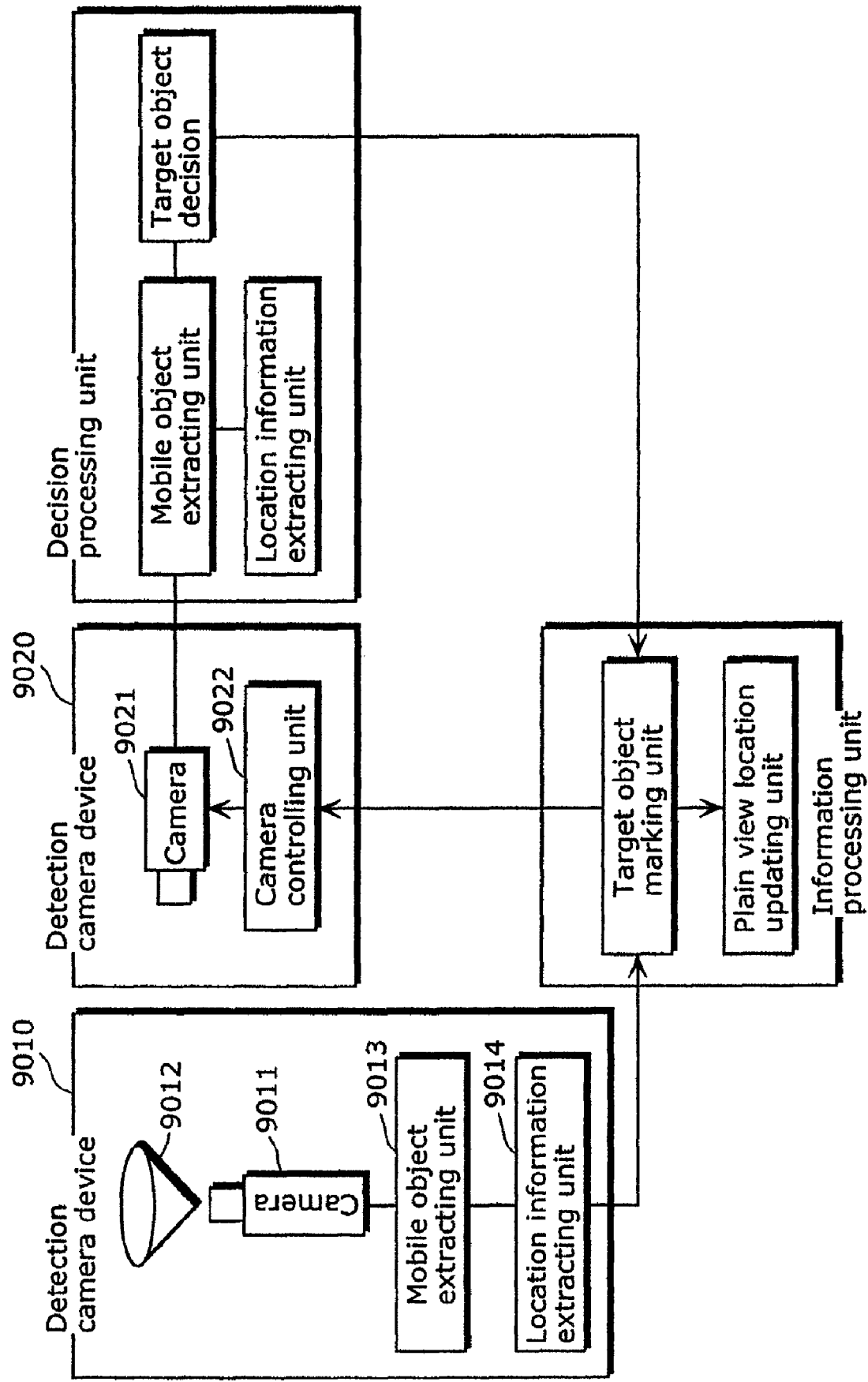
FIG. 1 is a configuration block diagram of a first conventional technique.
Figure 2:
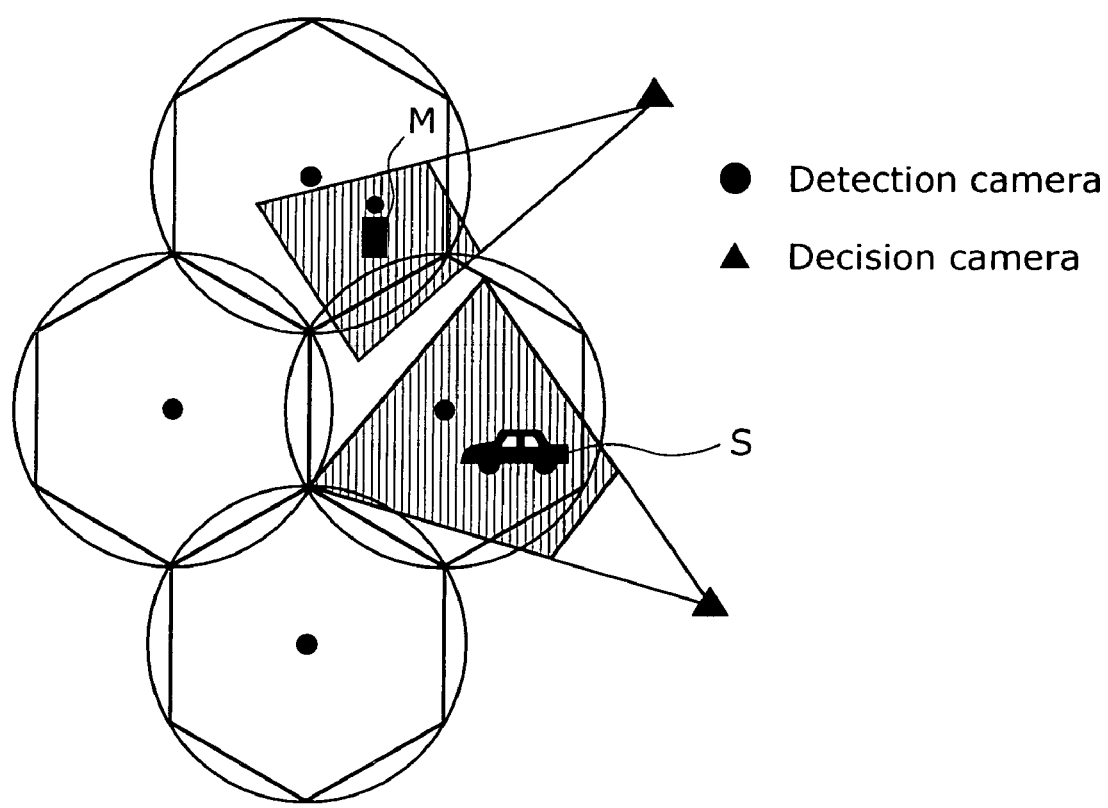
FIG. 2 is an explanatory diagram that shows a camera view range in the first conventional technique.
Figure 3:
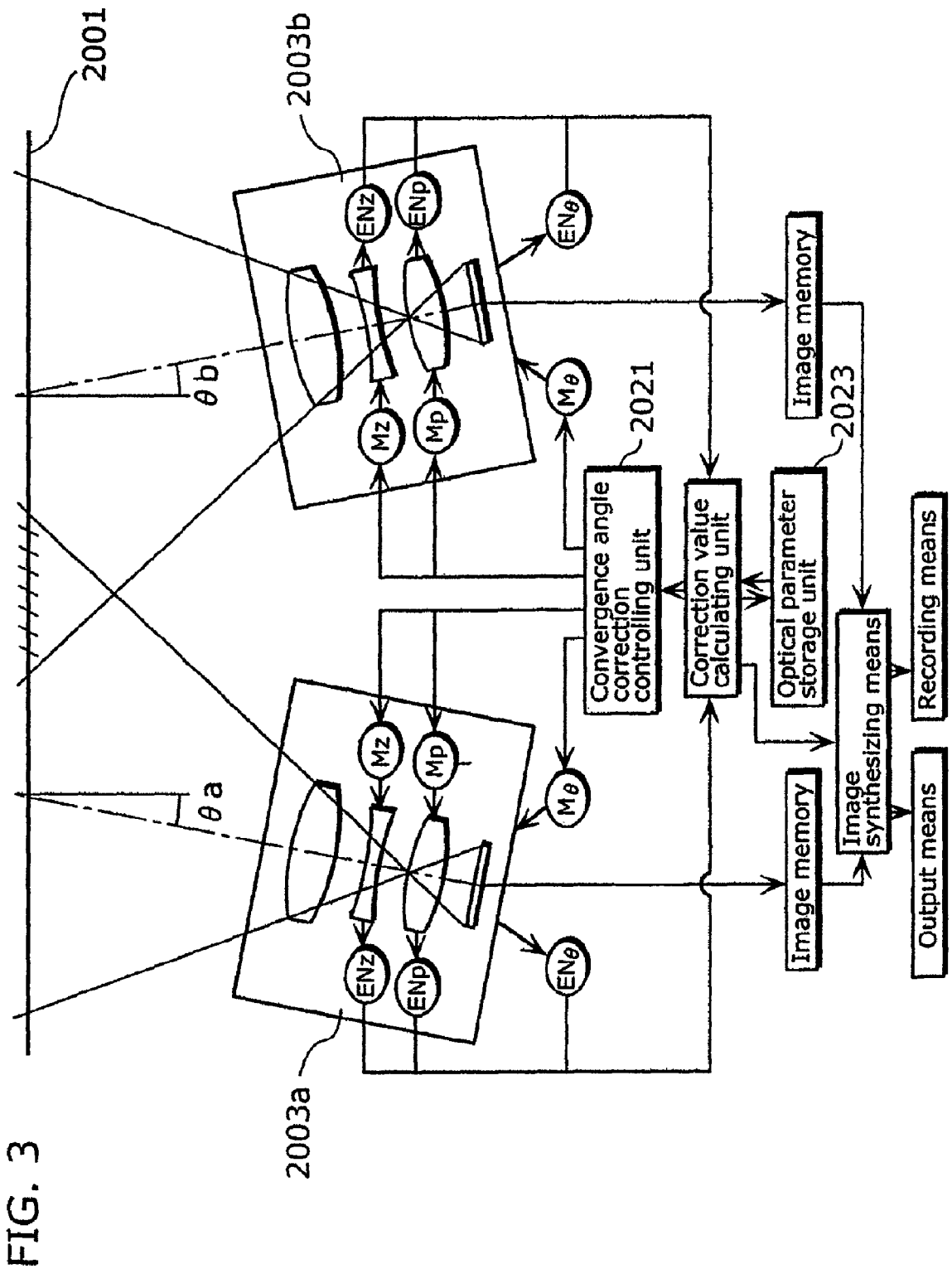
FIG. 3 is a configuration diagram that shows a second conventional technique.
Figure 4:
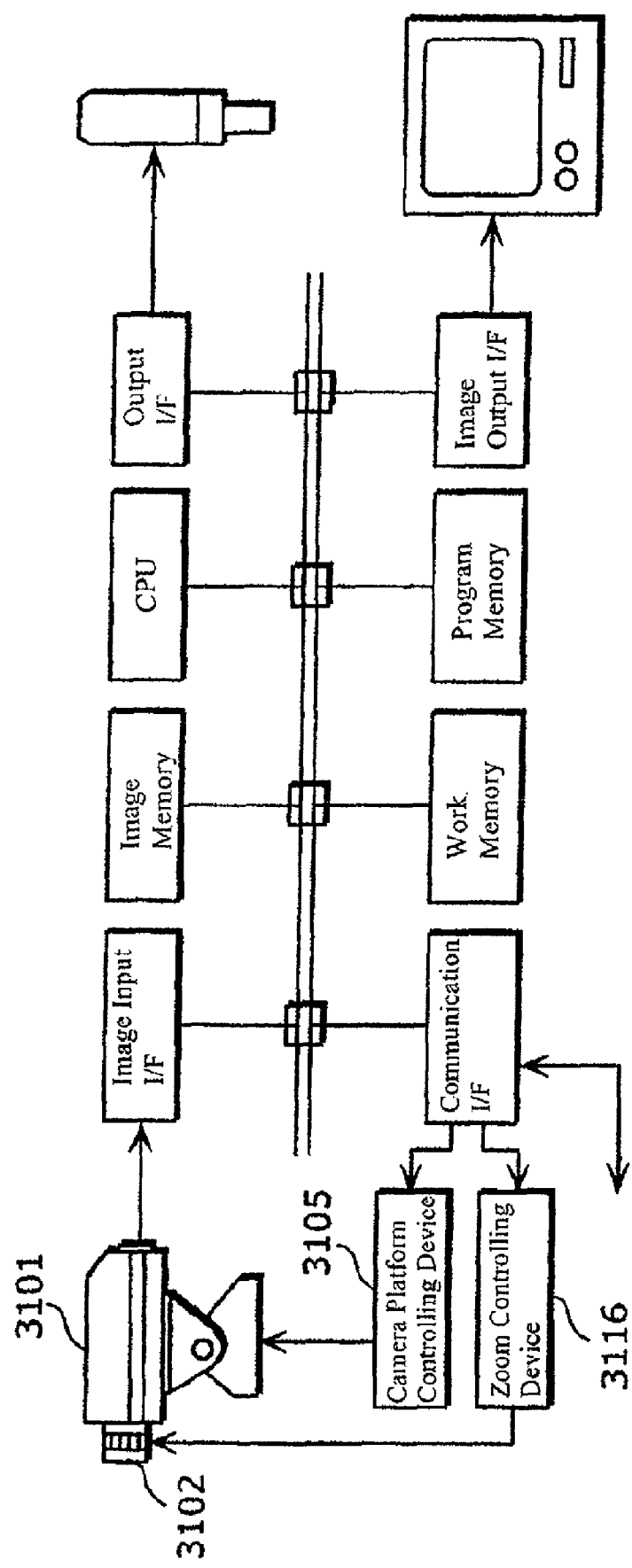
FIG. 4 is a configuration diagram that shows a third conventional technique.
Figure 5:
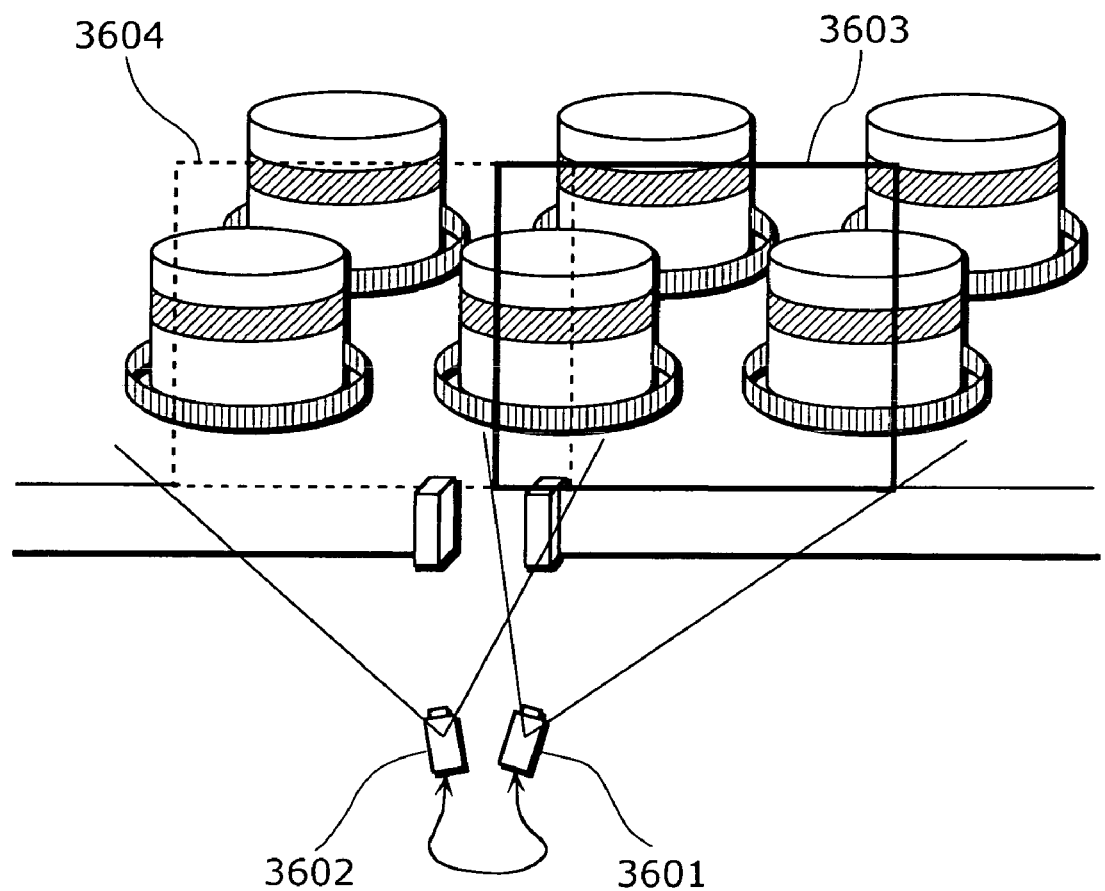
FIG. 5 is an explanatory diagram that shows a camera view range in the third conventional technique.
Figure 6:
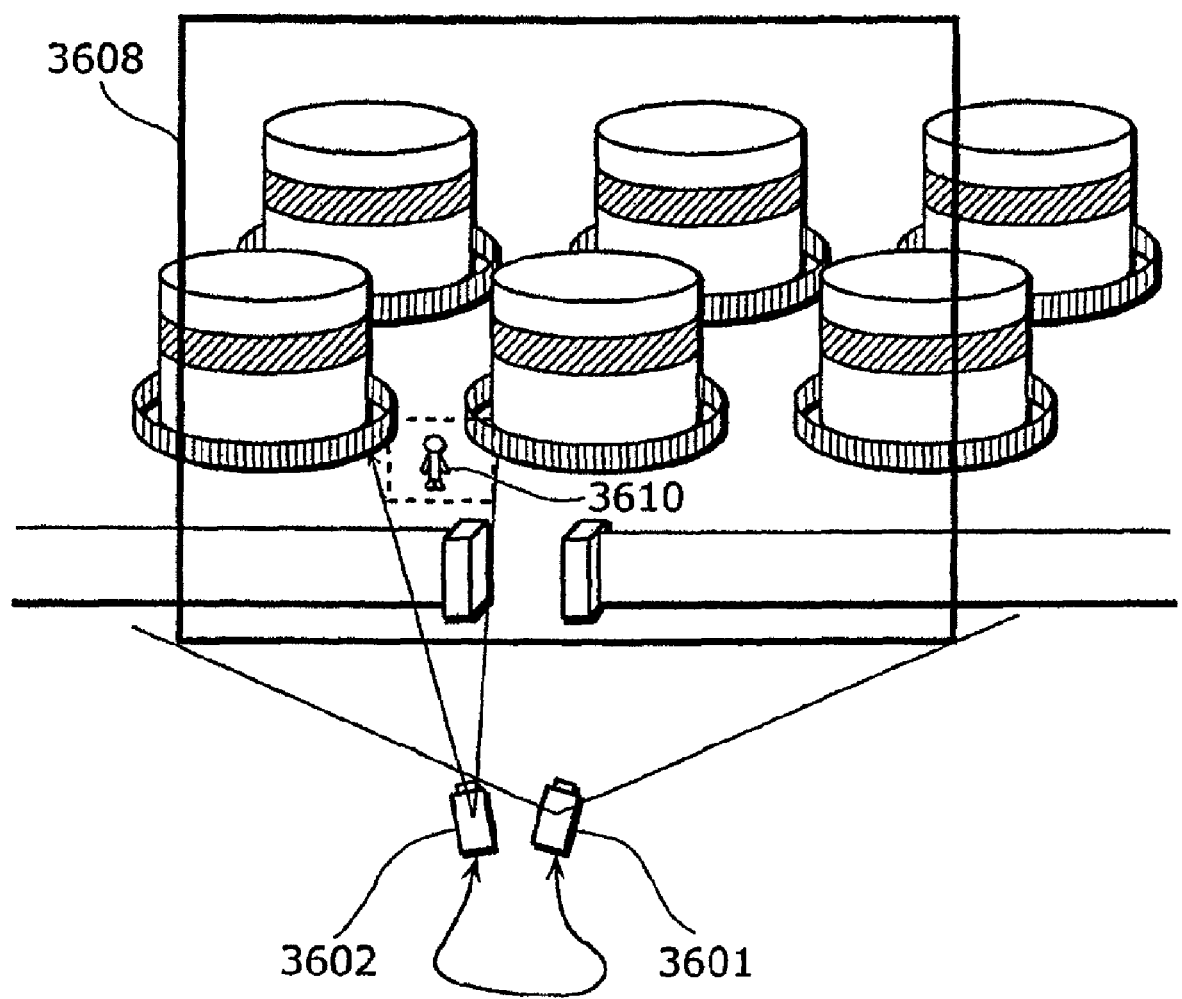
FIG. 6 is an explanatory diagram that shows a camera view range in the third conventional technique.
Figure 7:
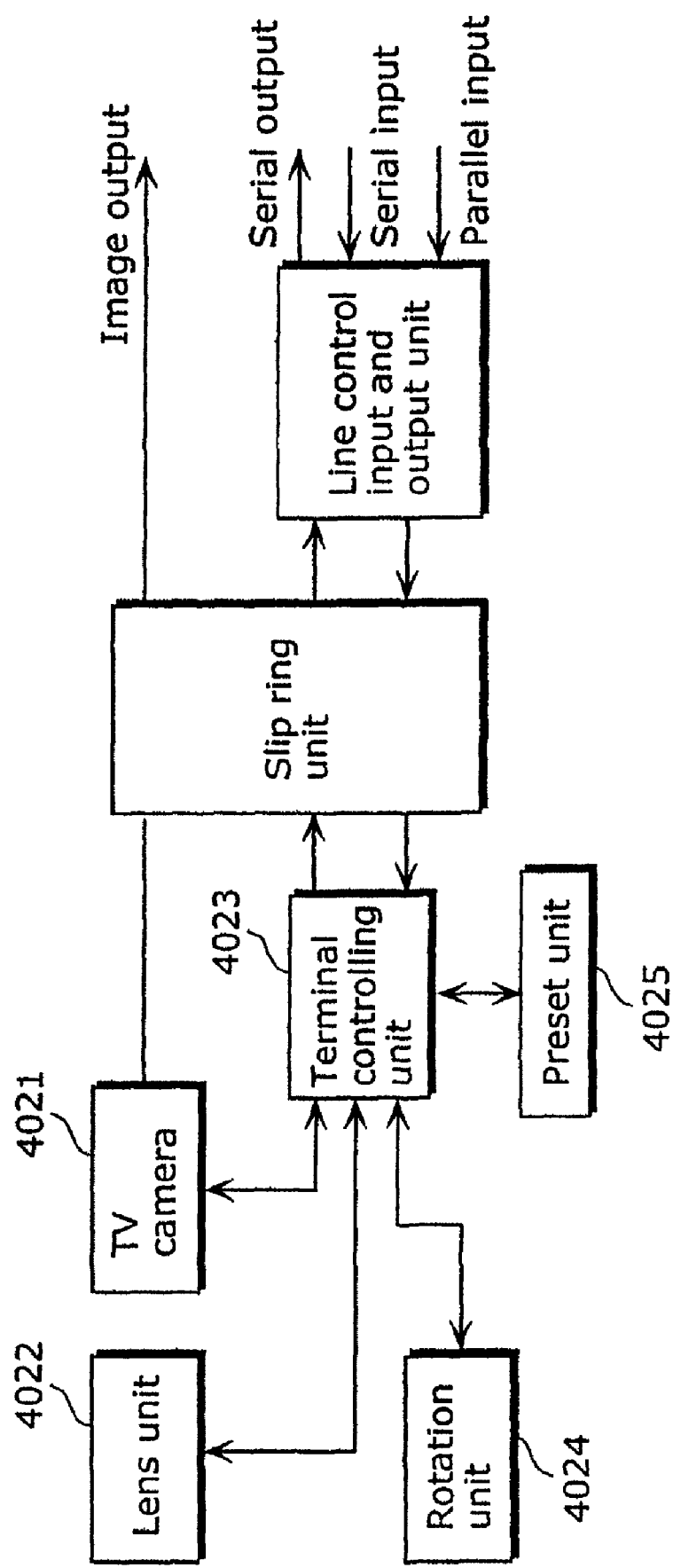
FIG. 7 is a configuration diagram that shows a fourth conventional technique.
Figure 8:
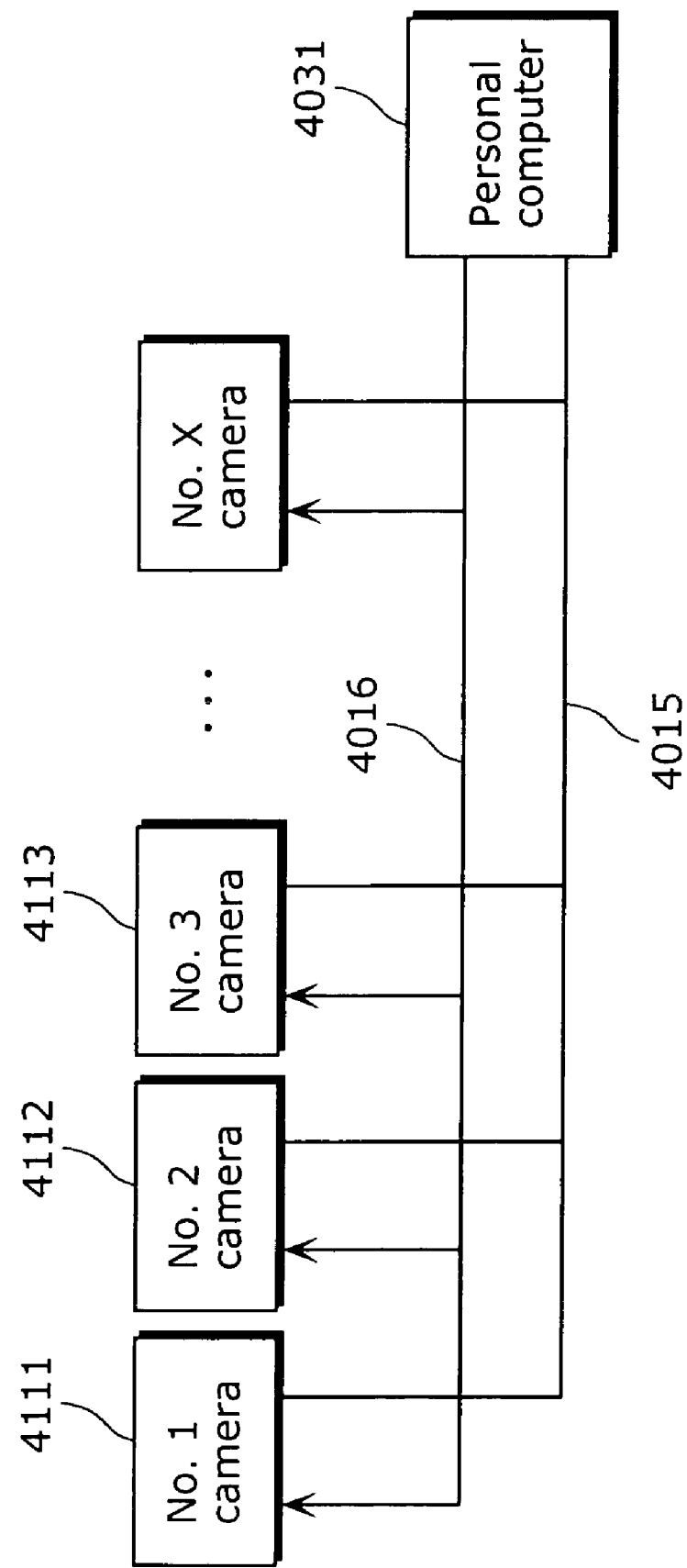
FIG. 8 is a configuration diagram that shows a fourth conventional technique.
Figure 9:
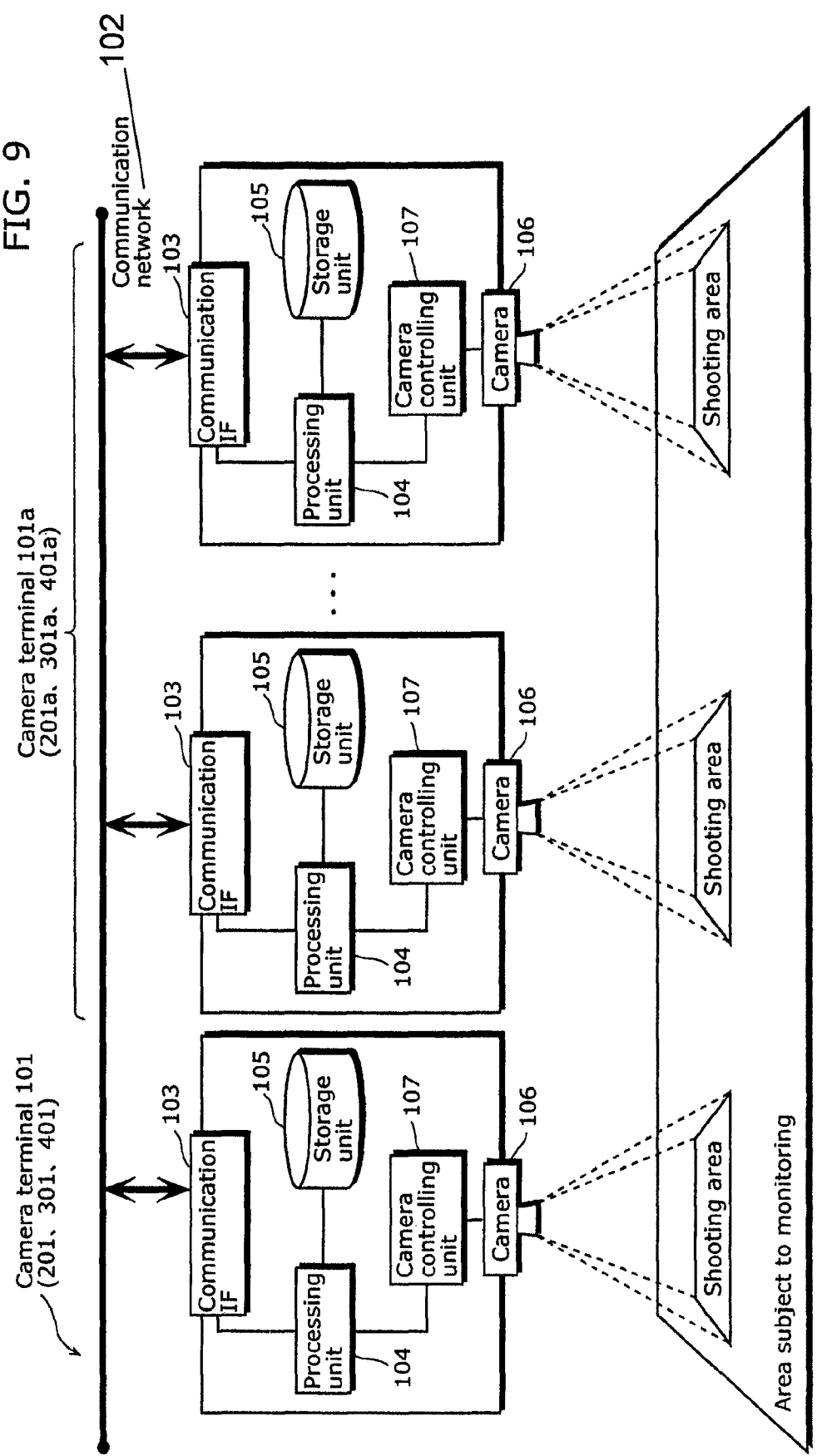
FIG. 9 is a block diagram that shows a configuration of a monitoring system related to the present invention.

FIG. 9 is a diagram that explains a configuration of the whole monitoring system. The monitoring system of the present invention is able to make pan, tilt and zoom adjustments for an area where a monitoring range is limited to a limited range (hereinafter called an area subject to monitoring) such as an indoor hall or living room, which includes a sufficient number of camera terminals 101 and 101a for shooting a whole area subject to monitoring and a communication network 102 such as an Ethernet cable, and so on for communication between these camera terminals 101 and 101a, and in which each of the camera terminals 101 and 101a is installed at a location where each can shoot the area subject to monitoring through pan, tilt and zoom adjustments.

As an installation example of the monitoring system, FIG. 9 shows one example that an entire floor surface in a room is an area subject to monitoring, and that plural camera terminals 101 and 101a are installed to monitor this area by directing them towards the floor from a ceiling of the room. In FIG. 9, a reference number, "camera terminal 101" is assigned to the camera terminal concerned and "camera terminals 101a" is assigned to a plurality of other camera terminals. In addition, FIG. 9 shows a configuration of the whole system commonly applicable in the embodiments 1 to 4, and reference numbers for camera terminals (the camera terminals 201 to 401, and a plurality of other camera terminals 201a to 401a) explained in other embodiments 2 to 4 are also illustrated here in the diagram.

Figure 10:
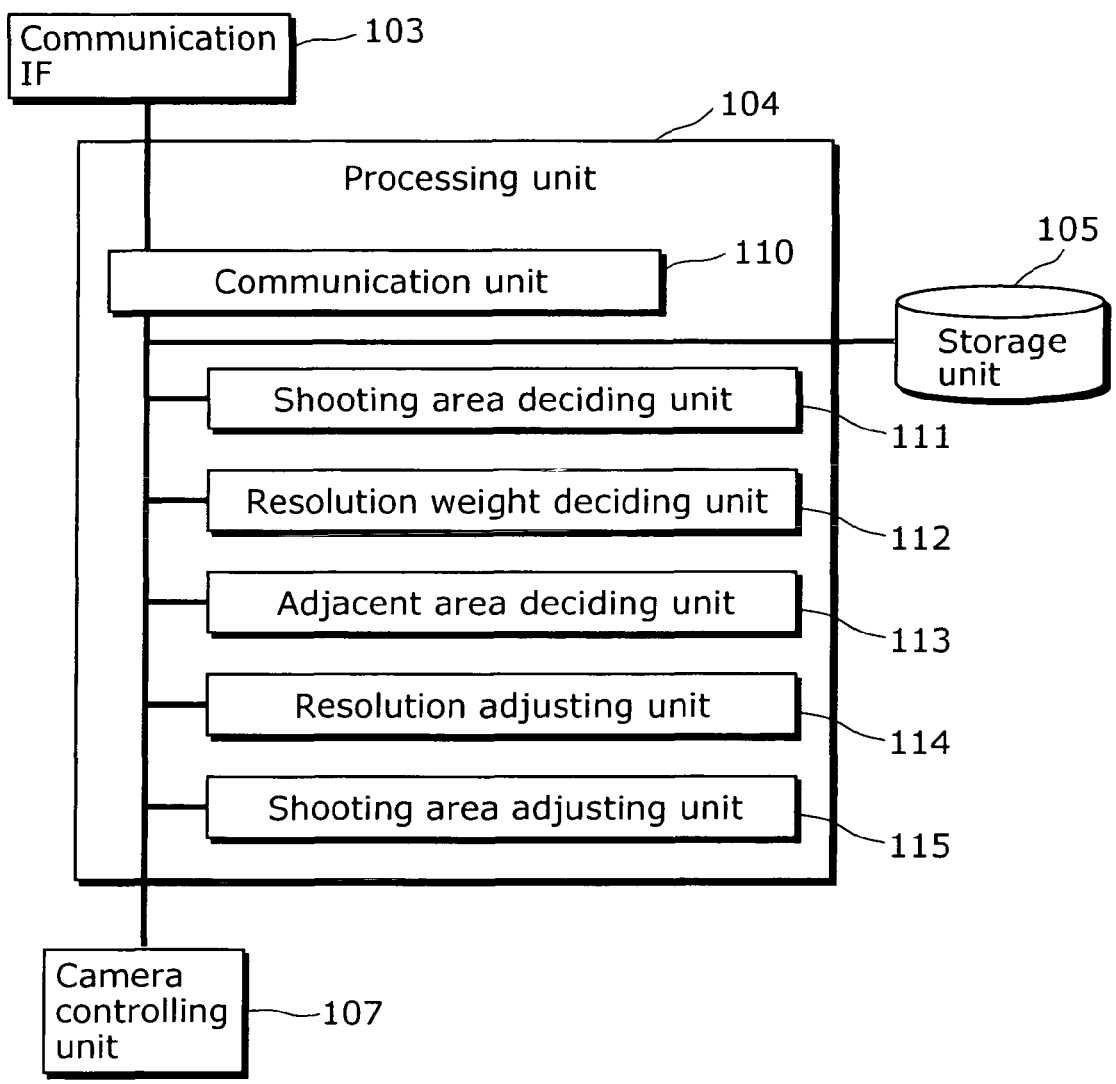
FIG. 10 is a block diagram to show a configuration of a processing unit in a first embodiment.

Next, an internal configuration of each camera terminal 101 is explained with reference to FIG. 9 and FIG. 10. Each of the camera terminal 101 is a camera device having a autonomously-cooperative function that adjusts a self shooting location and a resolution while it communicates with the other camera terminals, which includes a communication IF 103, a processing unit 104, a storage unit 105, a camera 106 and a camera controlling unit 107.

In FIG. 9, the communication IF 103 is a communication interface, and so on for exchanging information with the other camera terminal 101a by using a communication network 102 or a wireless means.

The processing unit 104 is a CPU, and so on that executes a calculation process necessary to control a pan angle, a tilt angle, zooming (a focal distance) of the camera terminal 101, which adjusts a resolution of the shooting area of the self camera terminal 101 to reduce a difference in the weighted resolution of the shooting area between the self camera terminal 101 and the other camera terminal 101a by controlling the camera 106 via the camera controlling unit 107 in the case a degree that sets a resolution of more important shooting area to be higher and a resolution of less important shooting area to be lower is treated as a weighted resolution, according to information related to a shooting area of the other camera terminal 101a obtained through the communication IF 103.

More specifically, the processing unit 104 in the present embodiment controls the camera 106 via the camera controlling unit 107 (1) to make the shooting area of the self camera terminal 101 adjacent to the shooting area of the other camera terminal 101a of which shooting area is located side-by-side, and (2) to reduce a difference of the weighted resolution obtained by having the resolution of the shooting area be combined with a weight of a resolution predefined to the shooting area, so that a location and a resolution of the shooting area of the self camera terminal 101 is adjusted. "The shooting area is adjacent" includes not only the case that the shooting area located side-by side is located next to it, but also includes the case where a part of the area overlaps.

The storage unit 105 is a memory, and so on that memorizes a controlling method of a pan angle, a tilt angle and zooming (a focal distance), a scope of an area subject to monitoring, information, and so on obtained through communications with the other camera terminal 101a.

The camera 106 is a pan, tilt and zooming camera (hereinafter called a PTZ camera) that can adjust a field angle through zooming controls, and so on and a location of the shooting area through pan and tilt operations.

The camera controlling unit 107 is a mechanical unit such as a stepping motor, and so on that reads out or adjusts a pan angle, a tilt angle and a zooming value (or a focal distance, and so on) through instructions from the processing unit 104.

Next, an internal configuration of the processing unit 104 is explained with reference to FIG. 10. The processing unit 104 includes a communication unit 110, a shooting area deciding unit 111, a resolution weight deciding unit 112, an adjacent area deciding unit 113, a resolution adjusting unit 114 and a shooting area adjusting unit 115.

The communication unit 110 is a processing unit that controls a communication procedure with the other camera terminal 101a. For example, it transmits a location of the shooting area of the self camera terminal 101 specified by the shooting area deciding unit 111 and a weight of a resolution corresponding to the shooting area of the self camera terminal 101 specified by the resolution weight deciding unit 112 to the other camera terminal 101a via the communication IF 103, and controls the communication IF 103 to receive the location of the shooting area of the other camera terminal 101a from the other camera terminal 101a and the weight of the resolution corresponding to that shooting location via the communication IF 103.

The shooting area deciding unit 111 is a processing unit that specifies a location of the shooting area of the self camera terminal 101. To be more specific, the shooting area deciding unit 111 decides an installation location and a installation direction of the camera terminal 101, and a scope that the camera terminal 101 is shooting (hereinafter called a shooting area) in the area subject to monitoring from a pan angle, a tilt angle and a zooming value (a focal distance) of the camera 106.

The resolution weight deciding unit 112 is a processing unit that specifies a weight of a resolution corresponding to the shooting area of the self camera terminal 101 specified by the shooting area deciding unit 111. To be more specific, the resolution weight deciding unit 112 finds a value for "a weight of a resolution" to weigh a value of the resolution of the camera terminal 101 according to importance of the shooting area in the area subject to monitoring of which importance of monitoring differs from a location to a location. In short, the resolution weight deciding unit 112 finds "a weight of a resolution in the case a degree that lowers a resolution of less important shooting area is set to be a weighted resolution. In the present embodiment, the resolution weight deciding unit 112 decides a weight of a resolution according to a resolution weight map where a weight of a resolution is predetermined for each location in the area subject to monitoring (floor surface).

The adjacent area deciding unit 113 is a processing unit that specifies a shooting area, and so on that is located next to the shooting area of the self camera terminal 101 based on a location of the shooting area of the other camera terminal received by the communication IF 103 and a location of the shooting area of the self camera terminal 101 specified by the shooting area deciding unit 111. To be more in detail, the adjacent area deciding unit 113 decides the shooting area of the other camera terminal 101a of which shooting area is adjacent, or a border line of the area subject to monitoring.

In the case a value that a resolution is combine with a weight of the resolution is set to be a weighted resolution, the resolution adjusting unit 114 is a processing unit that adjusts a resolution of the shooting area of the self camera terminal 101 by controlling size of the shooting area of the camera 106 via the camera controlling unit 107 to reduce a difference between a weighted resolution of the shooting area of the self camera terminal 101 and a weighted resolution of the shooting area of the other camera terminal 101a specified by the adjacent area deciding unit 113 based on a location of the shooting area of the other camera terminal 101a and a weight of the resolution corresponding to that shooting area received by the communication IF 103 and the weight of the resolution corresponding to the shooting area of the self camera terminal 101 specified by the resolution weight deciding unit 112. To be more specific, the resolution adjusting unit 114 compares a value that a resolution of the shooting image is combined with a weight of a resolution decided by the aforementioned resolution weight deciding unit 112 with a weighted resolution of the other camera terminal 101a of which shooting area is decided to be adjacent by the aforementioned the adjacent area deciding unit 113, and adjusts a zooming value (a focal distance) to equalize both of weighted.

Based on a location of the shooting area of the self camera terminal 101 specified by the shooting area deciding unit 111 and a shooting area specified by the adjacent area deciding unit 113, the shooting area adjusting unit 115 is a processing unit that adjusts the location of the shooting area of the camera 106 to make these areas be adjacent via the camera controlling unit 107. To be more specific, the shooting area adjusting unit 115 adjusts a pan angle, a tilt angle and a zooming value (a focal distance) via the camera controlling unit 107 to make the shooting area be adjacent to the shooting area of the other camera terminal 101a decided to be adjacent in the adjacent area deciding unit 113 and to a boarder line of the area subject to monitoring.

Figure 11:
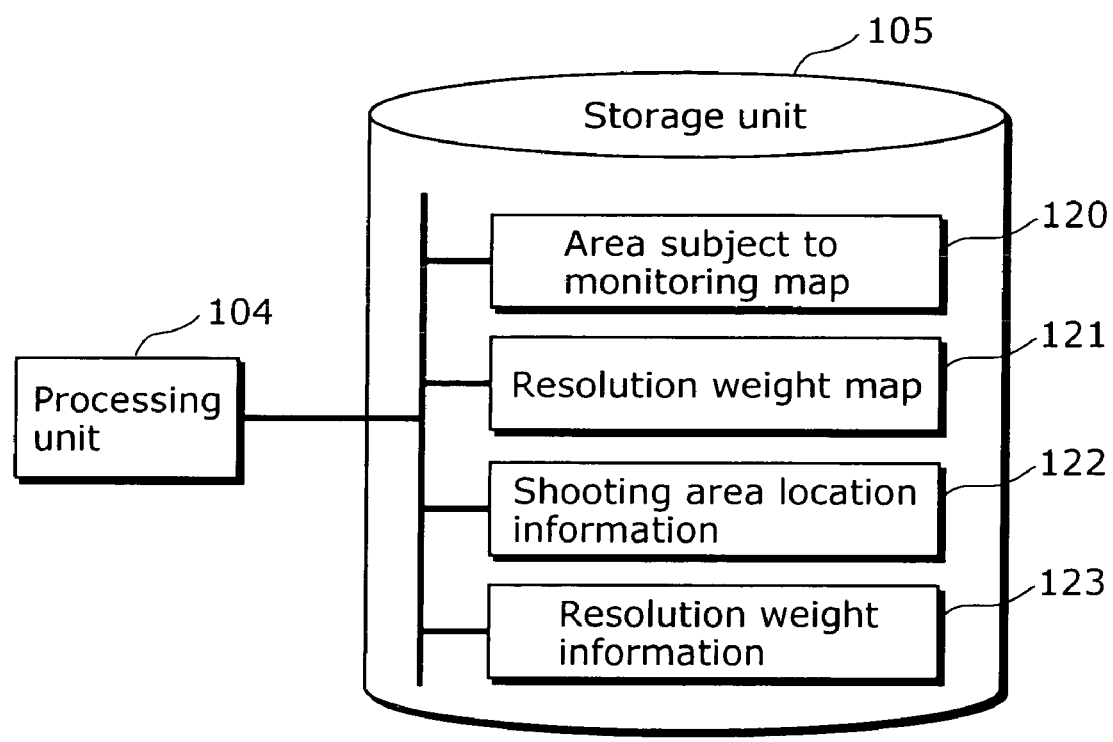
FIG. 11 is a block diagram to show a configuration of a storage unit in the first embodiment.

Next, information memorized in the storage unit 105 is explained with reference to FIG. 11. The storage unit 105 memorizes an area subject to monitoring map 120, a resolution weight map 121, shooting area location information 122 and resolution weight information 123.

The area subject to monitoring map 120 is map information that defines a scope of an area to be monitored by the camera terminal 101. For example, it is information shown in FIG. 12A.

The resolution weight map 121 is map information that defines a rule to judge a weight of resolution of the camera terminal 101 by each location on the area subject to monitoring map 120. For example, as shown in FIG. 12B, it defines a weight of resolution by each location (a block number) where the area subject to monitoring is divided into a grid type of small area.

Figure 12:
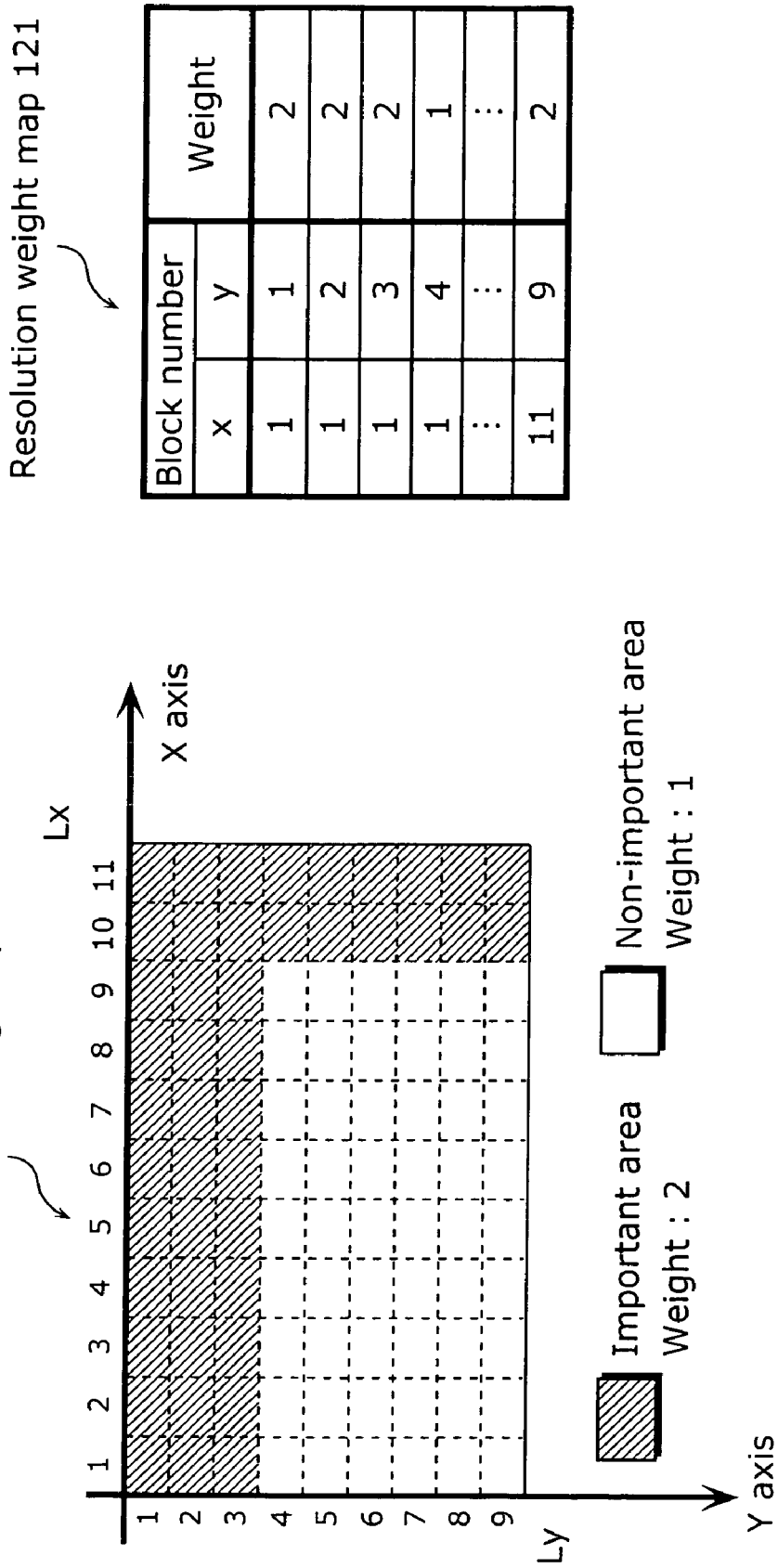
FIGS. 12A and 12B show a data example that is memorized in a storage unit in the first embodiment.

In the area subject to monitoring map 120 in FIG. 12A, information of the resolution weight map 121 is described as color information per location to show both information of the area subject to monitoring map 120 and the resolution weight map 121 on a map.

Also, the area subject to monitoring map 120 shown in FIG. 12A and the resolution weight map 121 shown in FIG. 12B are available in advance in the storage unit 105 of each of the camera terminal 101.

In addition, the area subject to monitoring map 120 in FIG. 12A is a map that a plain and rectangular area is treated as an area subject to monitoring for simplify the explanation. But it may be a map that defines an area having some shape other than a rectangle, an area of curving shape or a three-dimensional space as an area subject to monitoring.

Additionally, the resolution weight map 121 divides an area in the area subject to monitoring into a smaller area with a specific granularity, and defines a weight of resolution by each area. However, other than that, it may be a content that uniquely decides a weight of resolution at each location in the area subject to monitoring. For example, it may directly define, for example, a scope by each area having the equivalent importance.

The shooting area location information 122 and the resolution weight information 123 of peripheral camera terminal 101a obtained via the communication unit 110 is further memorized in the storage unit 105a, the content is updated with the latest shooting area location information 122 and resolution weight information 123 every time communication is done with the other camera terminal 101a.

Figure 13:
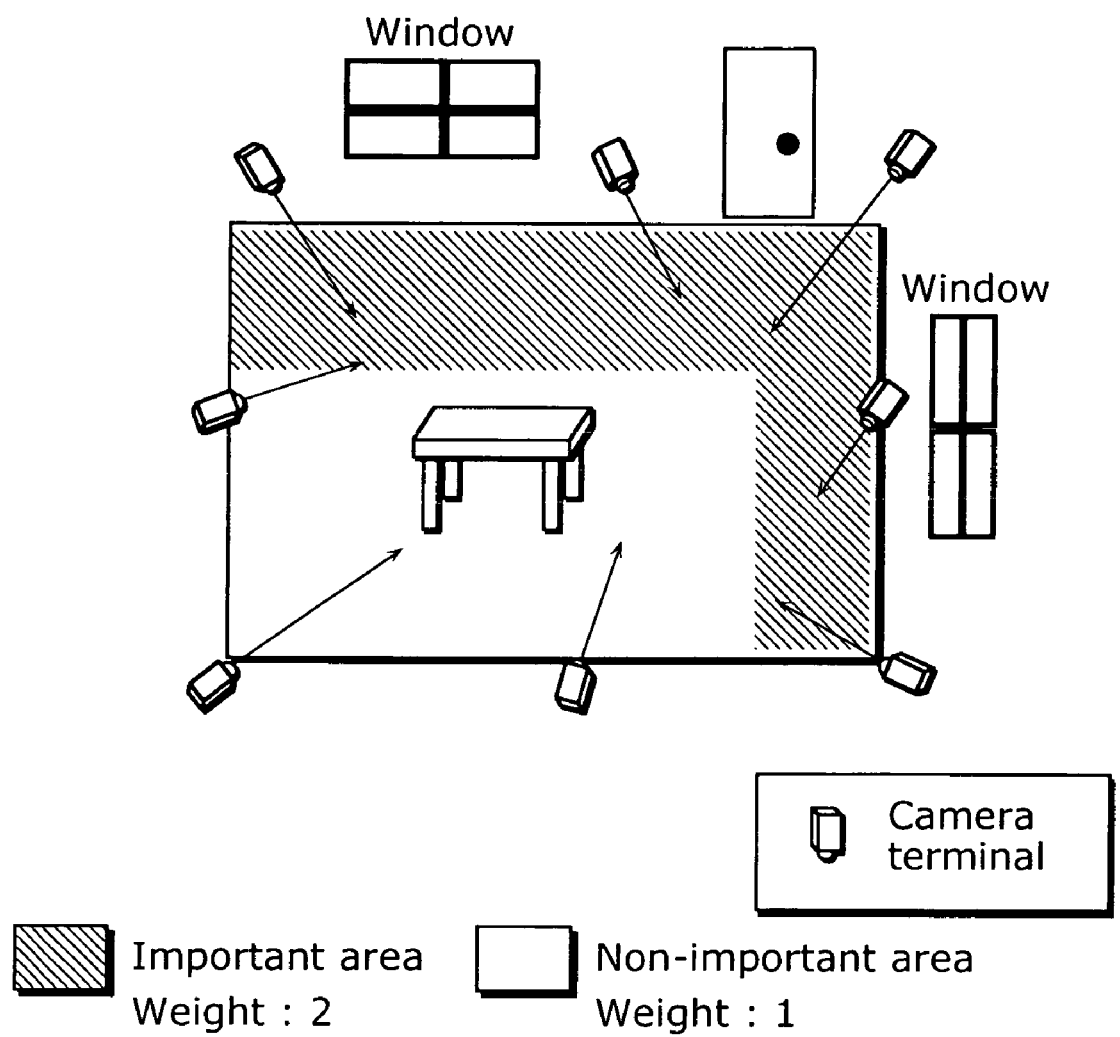
FIG. 13 is a diagram to show an installation example a camera terminal in the first embodiment.

Next, as an example of installation of the camera terminal 101 in the first embodiment 1, using a case eight sets of the camera terminal 101 are installed in a room having a rectangular floor shape as shown in FIG. 13, the following explains a controlling method to have the camera terminal 101 thoroughly shoot a whole area subject to monitoring with having a difference in mutual resolution according to importance of locations shot by the plural camera terminals 101 in the first embodiment.

In FIG. 13, regarding the number of the camera terminals 101, for example, suppose a value for a focal distance of the camera terminal 101 is in a middle of its maximum and minimum values, and size of a shooting area in the case an area from a ceiling to a floor in the area subject to monitoring is taken is a standard area, the number of the camera terminals 101 used makes a total of the standard area of each of the camera terminal 101 bigger than size of the whole area subject to monitoring. Therefore, suppose there are a sufficient number of the camera terminals 101 available to shoot the whole area subject to monitoring. Also, the area subject to monitoring map 120 and the resolution weight map 121 for the area subject to monitoring in FIG. 13 are expressed by the area subject to monitoring map 120, and the resolution weight map 121 in FIG. 12B.

Figure 14:
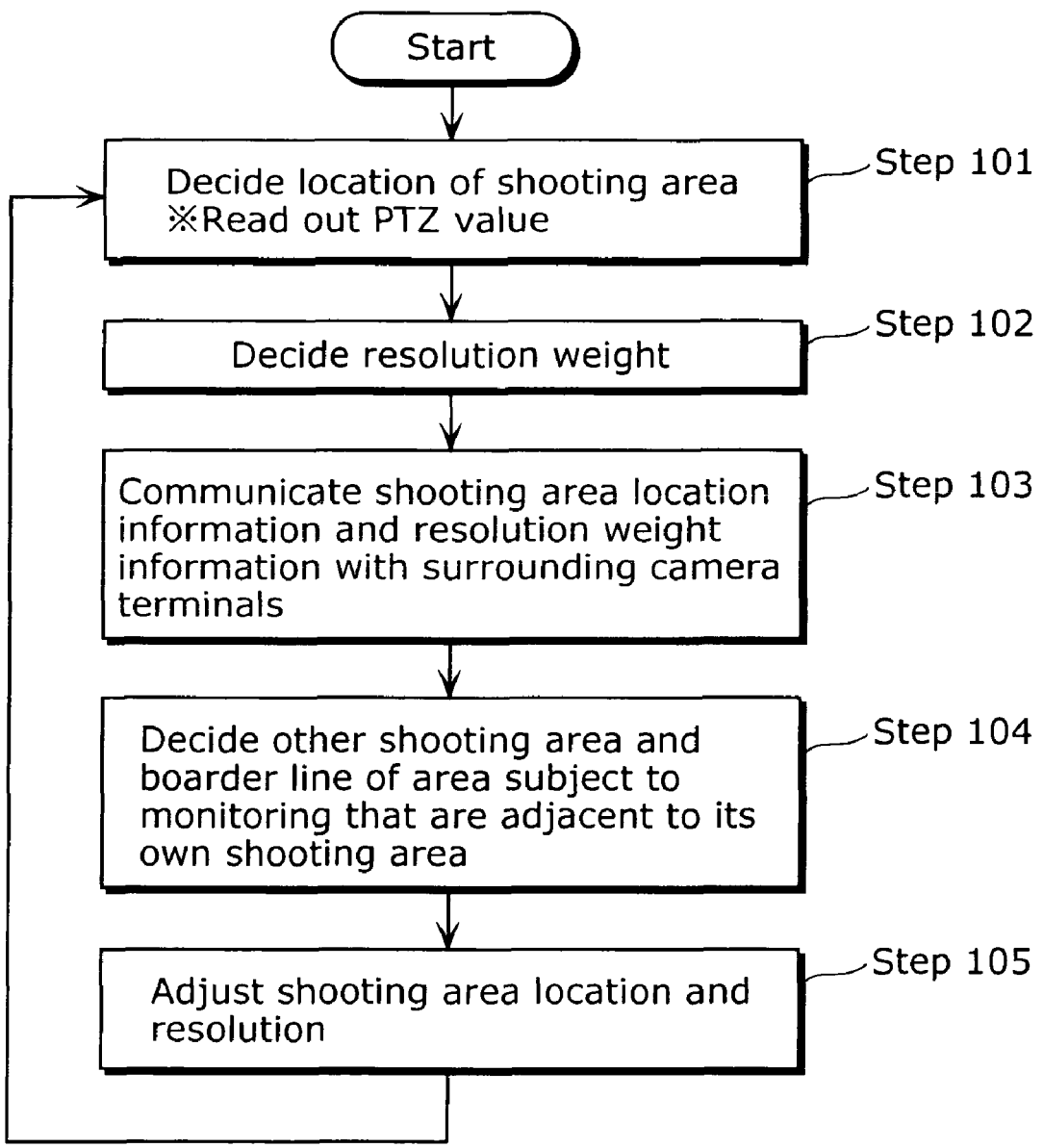
FIG. 14 is a flow chart that explains a controlling procedure of the camera terminal in the first embodiment.

FIG. 14 shows a flow chart that indicates a series of controlling methods of each of the camera terminal 101. The following explains a controlling method of the camera terminal 101 according to each step in the flow chart.

(Step 101)

The shooting area deciding unit 111 obtains a pan angle, a tilt angle and a zooming value (focal distance) and so on of the camera 106 from the camera controlling unit 107, and calculates an area shot by the camera terminal 101 on the area subject to monitoring map 120 memorized in the storage unit 105 (hereinafter called a shooting area). A calculation method for the camera terminal 101 installed at a ceiling shown in FIG. 13 to calculate a location of a shooting area on the area subject to monitoring map 120 from its installation location and direction, values of the pan angle and the tilt angle and the zooming value (focal distance) is explained later in a supplemental explanation.

(Step 102)

Next, the resolution weight deciding unit 112 decides a weight of resolution of the camera terminal 101 from a location on the resolution weight map 121 corresponding to a location of the shooting area obtained in the Step 101.

Figure 15:
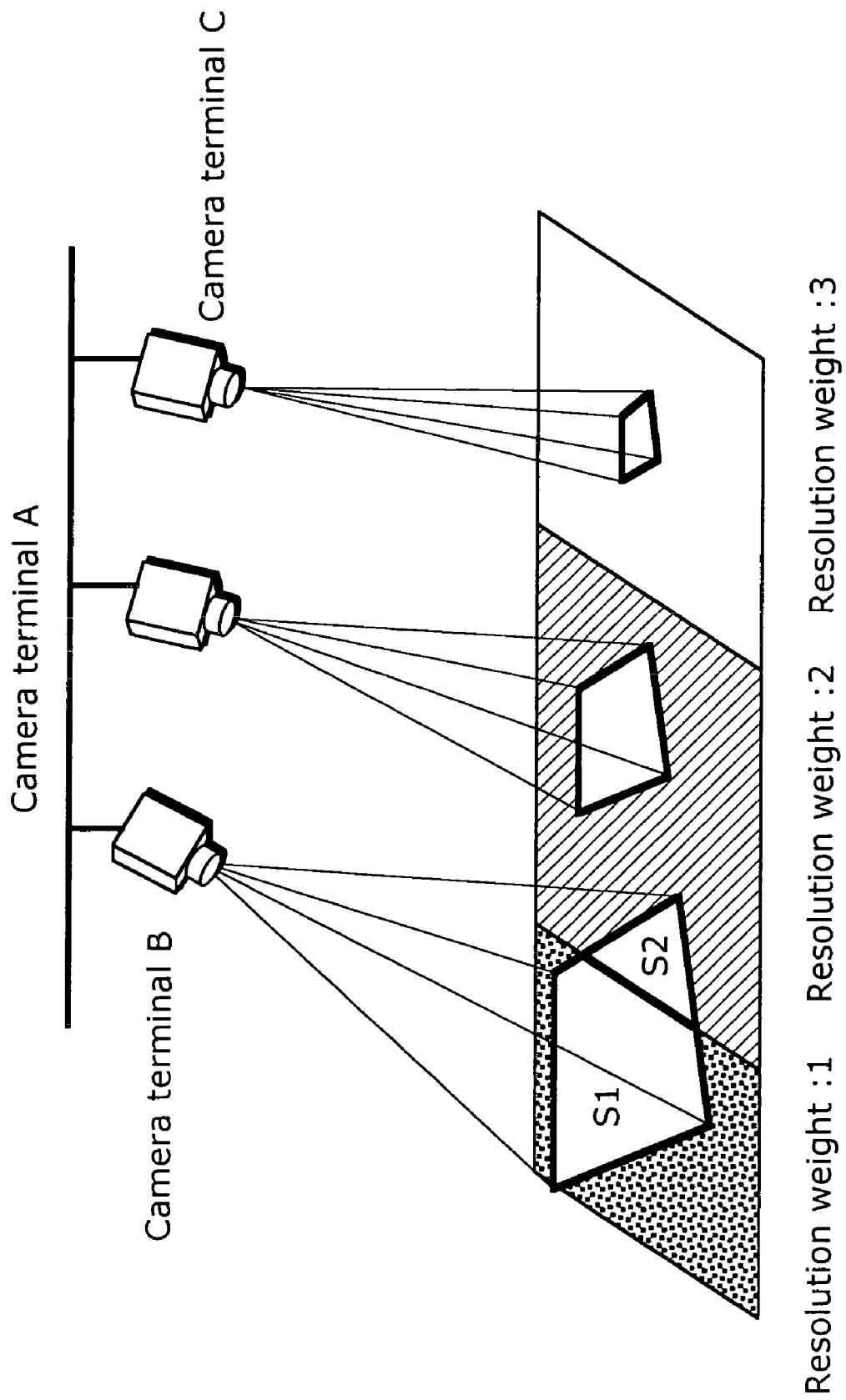
FIG. 15 is a diagram to explain motions of the camera in the first embodiment.

In the first embodiment 1, the weight of the resolution for the area subject for monitoring is decided per location according to the resolution weight map 121. For example, as shown in FIG. 15, in the case an area of which weight of resolution between a cameral terminal A and a camera terminal C is the same, a value is the weight of resolution for the camera terminal itself. In an example of FIG. 15, the weight of resolution for the camera terminal A is decided to be 2, and the weight of resolution for the camera terminal C is decided to be 3.

In addition, like the case of a camera B that shoots an area overlaps between areas having a different resolution weight, an average value of the resolution weight in the shooting weight is used. As a method to obtain an average value, a result of a resolution weight multiplied by size of each area having a different resolution weight is totaled, and finally divided by the size of the whole shooting area. For example, in FIG. 15, suppose size of an area where a resolution weight of the camera terminal B is 1 is S1, and size of an area where a resolution weight is 2 is S2, a resolution weight can be obtained by (1×S1+2×S2)/(S1+S2).

Regarding the resolution weight of the camera terminal 101, besides the method explained above, in order to prioritize shooting with high resolution for a location where a value of the resolution weight is bigger, it is possible to decide the resolution weight of the camera terminal 101 to be the biggest value among values of the resolution weight within the shooting area. Or, to simplify its calculation process, a resolution weight at a location pointed by central coordinates in the shoot area may be used.

(Step 103)

Next, the communication unit 110 sends and receives the camera terminal 101a, mutual shooting area location information 122 and mutual resolution weight information 123 with its peripheral camera terminal 101a in certain time interval such as 10 times in a second, and shares location information and resolution weight in the shooting area with the other camera terminal 101a.

(Step 104)

The adjacent area deciding unit 113 specifies a shooting area of the other camera terminal 101a of which shooting area is adjacent or a boarder line of the area subject to monitoring from the shooting area location information 122 and a map of area subject to monitoring of the other camera terminal 101a memorized in the storage unit 105.

The adjacent area deciding unit 113 in the first embodiment decides a mutually adjacent shooting area, or a boarder line of the area subject to monitoring one by one for a direction vertically intersecting with each boarder line in the area subject to monitoring from central coordinates of its shooting area. In the first embodiment, since a shape of the area subject to monitoring is rectangular as shown in FIG. 12B and FIG. 13, it means the camera terminal 101 decides a shooting area of the other camera terminal 101a or a boarder line of the area subject to monitoring for 4 directions creating a perpendicular angle to a boarder line of the area subject to monitoring. Also, if there are plural shooting areas in one direction, the one of which central coordinates of its shooting area is closest is selected.

In the adjacent area deciding unit 113, for example, if a shooting area of the camera terminal 101 is located as FIG. 16A, the camera terminal A decides a border line of the area subject to monitoring at the north and west sides, a shooting area of the camera terminal C at the south side, and a shooting area of the camera terminal B at the east side as its adjacent shooting area.

(Step 105)

The resolution adjusting unit 114 adjusts a value of resolution according to importance of an area mutually shot with the peripheral the camera terminal 101a, and further adjust a location of shooting area in order not to create any dead area in its surrounding by locating its shooting area adjacent to the shooting area of the other camera terminal 101 of which shooting area is adjacent to, or locating its shooting area adjacent to a border line of the area subject to monitoring without any gap.

At first, a controlling method to adjust resolution by the resolution adjusting unit 114 is explained.

Here, to explain contents of the adjustment done by the resolution adjusting unit 114, the current resolution of the camera terminal 101 itself is r, its resolution weight is w, resolution of N sets of the camera terminals 101 that shoot an area adjacent to the shooting area memorized in the storage unit 105 is Ri, and their resolution weight is Wi (however, i=(1, 2, . . . , N). Based on this, a relationship between the camera terminal 101 and its peripheral camera terminal 101a is defined according to an evaluation function F (r) shown in the following formula 1.

[Mathematical Expression 1]

$$F(r) = \sum_{i=1}^{N} (r \times w - R_i \times W_i)^2 \qquad \text{(Formula 1)}$$

However, a value obtained through a definition defined by the following formula 2 is used for the resolution r of the camera terminal 101 if size of the shooting area of the camera terminal 101 is $S_{Area}$ and the number of effective pixels for CCD is $N_{Pixel}$.

[Mathematical Expression 2]

$$r = S_{Area} \div N_{Pixel} \qquad \text{(Formula 2)}$$

The evaluation function F(r) defined in the above formula 1 is one obtained through: a difference between a value, which is resulted by resolution of the camera terminal 101 multiplied by a resolution weight obtained by the resolution weight deciding unit 112 (hereinafter called weighted resolution), and weighted resolution of the camera terminal 101a that shoots its surrounding, is squared and added to resolution of the camera terminal 101.

Therefore, the evaluation function F(r) becomes smaller if the weighted resolution of the camera terminal 101 becomes a value closer to the weighted resolution of the camera terminal 101a. On the contrary, the function becomes bigger if the weighted resolution of the surrounding camera terminal 101a becomes a value largely different from the value of the weighted resolution of the camera terminal 101.

The resolution adjusting unit 114 realizes adjustment to make resolution different according to a resolution weight assigned by each area by adjusting a zooming value (focal distance) of the camera 106 to make the weighted resolution of the camera terminal 101 be equal to the weighted resolution of the surrounding the camera terminal 101a. Therefore, in order to reduce a difference between its own weighted resolution and the weighted resolution of its surrounding camera terminal 101a, the resolution adjusting unit adjusts resolution to reduce a value of the evaluation function F(r). In the first embodiment, the resolution is indirectly adjusted by adjusting a value of the focal distance f of the camera terminal 101. Therefore, by using a partial differential equation shown in the following formula 3 using a function that the evaluation function in the above formula 1 is differentiated partially by a value of the focal distance f and adjusting the value of the focal distance f through a steepest descent method, it is possible for the camera terminal 101 to reduce the value of the evaluation function F(r). In short, it is possible to control the focal distance f to make an error of its own weighted resolution smaller in relation to the weighted resolution of the surrounding camera terminal 101a.

[Mathematical Expression 3]

$$\frac{\partial f}{\partial t} = -\alpha \frac{\partial F(r)}{\partial f} \quad \text{(Formula 3)}$$

In this regard, however, a is a coefficient. Also, the evaluation function F(r) is a focal distance f and is a function possible for partial differentiation.

In the way like this, it is possible to make the value of the weighted resolution for all of the camera terminal 101 be a uniform value by having all of the camera terminals 101 adjust its own value of the evaluation function F(r) through the resolution adjusting unit 114.

Also, in the embodiment 1, as the weighted resolution, the one that the current resolution r of the camera terminal 101 is simply multiplied by the weight of resolution w, i.e. (r×w), is used. However, it is possible to use something of which definition for the weighted resolution is changed according to a purpose. For example, a value of resolution ($w^2$) squared to reflect an effect of the resolution weight stronger, or resolution r multiplied by a nonlinear function G(w) such as a sigmoidal function shown in the following formula to provide a function for showing an effect when a weighted value exceeds a certain threshold value may be used.

[Mathematical Expression 4]

$$G(w) = \alpha \frac{1}{1 + e^{-w}} + \beta \quad \text{(Formula 4)}$$

In this regards, however, α and β are a constant number.

In addition, in the first embodiment, by making the weighted resolution obtained by the current resolution r of the camera terminal 101 multiplied by the resolution weight w be uniformed among each of the camera terminals 101, a ratio of the resolution r of an image shot by each of the camera terminal 101 is adjusted to be closer to a ratio of the resolution weight w. However, it may be possible to define the weighted resolution as one that a resolution weight w is added to the current resolution (r+w). In the case that the resolution r of the camera terminal 101 is adjusted by using the weighted resolution (r+w) that the resolution weight w is added to the current resolution r, it is possible to adjust the resolution r of each of the camera terminal 101 to make it different for the resolution weight w.

In addition, the weighted resolution may be a value that the resolution r of an shooting image of the camera terminal 101 shooting an important area is higher than the resolution r of the camera terminal 101 shooting other area when a value of the weighted resolution of each camera terminal 101 is uniformed, such as using a value defined in a power form ($r^w$) with resolution r as a base and the resolution weight was an index.

Next, a controlling method to adjust a shooting area by the shooting area adjusting unit 115 is explained.

Here, in order to explain controlling contents of the shooting area adjusting unit 115, the evaluation function H ($\theta_{Pan}$, $\theta_{Tilt}$, f) for the current shooting area of the camera terminal 101 itself, overlapping, i.e. size of the area overlapping with shooting are of the other camera terminal 101a adjacent to this, and a value of distance, i.e. distance up to a boarder line of the area subject to monitoring, is defined as the following formula 5. However, the evaluation function H ($\theta_{Pan}$, $\theta_{Tilt}$, f) is a function having values of a pan angle $\theta_{Pan}$, a tilt able $\theta_{Tilt}$, and a focal distance f as an argument, and a number of shooting area, which is adjacent to the camera terminal 101 itself is m, and the number of boarder lines as n.

[Mathematical Expression 5]

$$H(\theta_{Pan}, \theta_{Tilt}, f) = \sum_{i}^{m} (overlap_i - C)^2 + \sum_{j}^{n} (distance_j - D)^2 \quad \text{(Formula 5)}$$

In this regards, however, (C, D) are a constant number.

In the evaluation function H ($\theta_{Pan}$, $\theta_{Tilt}$, f) of the above formula 5, the first term of the right-hand side indicates a square sum of a difference between size and its target value (a constant C) for an overlapping width with its adjacent shooting area, and the second term indicates a square sum of a difference between distance and its target value (a constant D) for a boarder line of its adjacent area subject to monitoring.

Here, in order to concretely explain how the evaluation function H ($\theta_{Pan}$, $\theta_{Tilt}$, f) is obtained, the shooting area of 3 sets of the camera terminal 101 are respectively located at a position shown in FIGS. 16A and 16B. In FIGS. 16A and 16B, in order to easily find size of the overlapping area between shooting areas and distance to a boarder line of the area subject to monitoring, for a shooting area where its size is obtained through supplemental explanation, a rectangle area inscribed to the boarder line of monitoring area with a parallel line is regarded as a shooting area.

In the case a camera terminal A, a camera terminal B and a camera terminal C are located as shown in FIG. 16A, the camera terminal A is adjacent to a boarder line of the area subject to monitoring at the north and west sides, and respectively adjacent to the camera terminal B at the east side and the camera terminal C at the south side. Therefore, a value of the evaluation function H for the camera terminal A under the situation of FIG. 16A is provided as the following formula 6.

[Mathematical Expression 6]

$$H(\theta_{Pan}, \theta_{Tilt}, f) = ((x_2 - x_B) - C)^2 + \\ ((y_2 - y_C) - C)^2 + ((x_0 - x_1) - D)^2 + ((y_0 - y_1) - D)^2 \quad \text{(Formula 6)}$$

To find an overlapping width between the shooting area A shot by the camera terminal A and the shooting area B shot by the camera terminal B, the first term of the right-hand side in the above formula 6 is a term that the target value (the constant C) is further subtracted from a value that is obtained through an end of the east side (x coordinates) of the shooting area A subtracted from an end of the west side (x coordinates) of the shooting area B, and that its result is squared.

To find an overlapping width between the shooting area A and the shooting area C shot by the camera terminal C, the second term of the right-hand side is a term that the target value (the constant C) is further subtracted from a value that is obtained through an end of the north side (y coordinates) of the camera terminal C subtracted from an end of the south side (y coordinates) of the shooting area A, and that its result is squared.

To find distance between the shooting area A and the boarder line at the west side, the third term of the right-hand side is a term that the target value (the constant D) is further subtracted from a value that is obtained through a position of the north side boarder line (y coordinates) subtracted from an end of the north side (y coordinates) of the shooting area A, and that its result is squared.

To find distance between the shooting area A and the boarder line at the north side, the fourth term of the right-hand side is a term that the target value (the constant D) is further subtracted from a vale that is obtained through the position of the boarder line at the north side (y coordinates) subtracted from an end of the north side (y coordinates) of the shooting area A, and that its result is squared.

In addition, in the case there is a certain overlapping width (a constant C) of the shooting area with the other camera terminal 101a having an adjacent shooting area as shown in FIG. 16B, and its own shooting area is adjacent to a border line of the area subject to monitoring, the evaluation function H ($\theta_{Pan}$, $\theta_{Tilt}$, f) of the above formula 6 is a function that chooses a minimum value when the shooting area is virtually projected for the distance (the constant D) to the outside of the boarder line to prevent any dead area in an area with the boarder line, and a function that the value becomes bigger as the overlapping width with the adjacent shooting area or the distance to the border line of the area subject to monitoring gets far from the constant C or the constant D.

Therefore, the shooting area adjusting unit 115 can reduce a dead area occurred in the shooting area of the surrounding camera terminal 101a or occurred in an area with the boarder line of the area subject to monitoring by adjusting the shooting area to make the value provided by the evaluation function H ($\theta_{Pan}$, $\theta_{Tilt}$, f) closer to a minimum value.

In the first embodiment, the camera terminal 101 adjusts a location of the shooting area by adjusting a pan angle $\theta_{Pan}$, a tilt angle $\theta_{Tilt}$ and a focal distance f so that the shooting area adjusting unit 115 controls values for the pan angle $\theta_{Pan}$, the tilt angle $\theta_{Tilt}$ and the focal distance f by a steepest descent method according to the following formulas 7, 8 and 9 that uses a function partially differentiated by the pan angle $\theta_{Pan}$, the tilt angle $\theta_{Tilt}$ and the focal distance f. By doing so, the shooting area adjusting unit 115 can adjust the shooting area of the camera terminal 101 to reduce any dead area that exists in a surrounding of its own shooting area.

[Mathematical Expression 7]

$$\frac{\partial \theta_{Pan}}{\partial t} = -\beta \frac{\partial H(\theta_{Pan}, \theta_{Tilt}, f)}{\partial \theta_{Pan}}$$ (Formula 7)

[Mathematical Expression 8]

$$\frac{\partial \theta_{Tilt}}{\partial t} = -\gamma \frac{\partial H(\theta_{Pan}, \theta_{Tilt}, f)}{\partial \theta_{Tilt}}$$ (Formula 8)

[Mathematical Expression 9]

$$\frac{\partial f}{\partial t} = -\delta \frac{\partial H(\theta_{Pan}, \theta_{Tilt}, f)}{\partial f}$$ (Formula 9)

In this regard, however, β, γ and δ are a coefficient.

Also, in the above Step 5, a field angle of the camera terminal 10 is controlled by both of the resolution adjusting unit 114 and the shooting area adjusting unit 115. Therefore, a partial differential equation for controlling a focal distance that decides a value for the field angle can be expressed by the following formula 10 that is combined from the above formula 3 and the above formula 8.

[Mathematical Expression 10]

$$\frac{\partial f}{\partial t} = -\alpha \frac{\partial F(r)}{\partial f} - \delta \frac{\partial H(\theta_{Pan}, \theta_{Tilt}, f)}{\partial f}$$ (Formula 10)

Furthermore, in the above formula 10, an adjustment function of the weighted resolution between the camera terminals is largely operated when the value of α is made to be bigger than the value of δ, and on the contrary, a function to reduce any dead area within the area subject to monitoring is largely operated when the value of δ is made to be bigger than the value of α. Therefore, it is possible, by adjusting a ratio of the coefficients α and δ, to adjust whether a monitoring action for an dead area for the monitoring system is prioritized or high-resolution shooting of an important area within the area subject to monitoring is prioritized.

In the way like this, by having all of the camera terminals 101 adjust values of its own evaluation function H ($\theta_{Pan}$, $\theta_{Tilt}$, f) through the shooting area adjusting unit 115, it is possible to adjust a position of the shooting area to make the shooting area of all of the camera terminals 101 be adjacent to the shooting area of the adjacent other camera terminal 101a or the boarder line of the area subject to monitoring without having any gap.

In the above formula 5, the explanation is provided based on a case that the values of the overlapping width C of the adjacent shooting area and the distance D to the boarder line of the adjacent area subject to monitoring are all identical among all of the camera terminals 101 that consist of the monitoring system. However, the values of the constant C and the constant D may vary between the camera terminals 101 according to installation locations of the camera terminals and/or density of installation, and so on. Also, other than a method to constantly use certain fixed values for the overlapping width C of the adjacent shooting area and the distance D to the adjacent boarder line, those values may be a variable that may, for example, automatically adjust the overlapping width according to the size of the adjacent shooting area.

Figure 17:
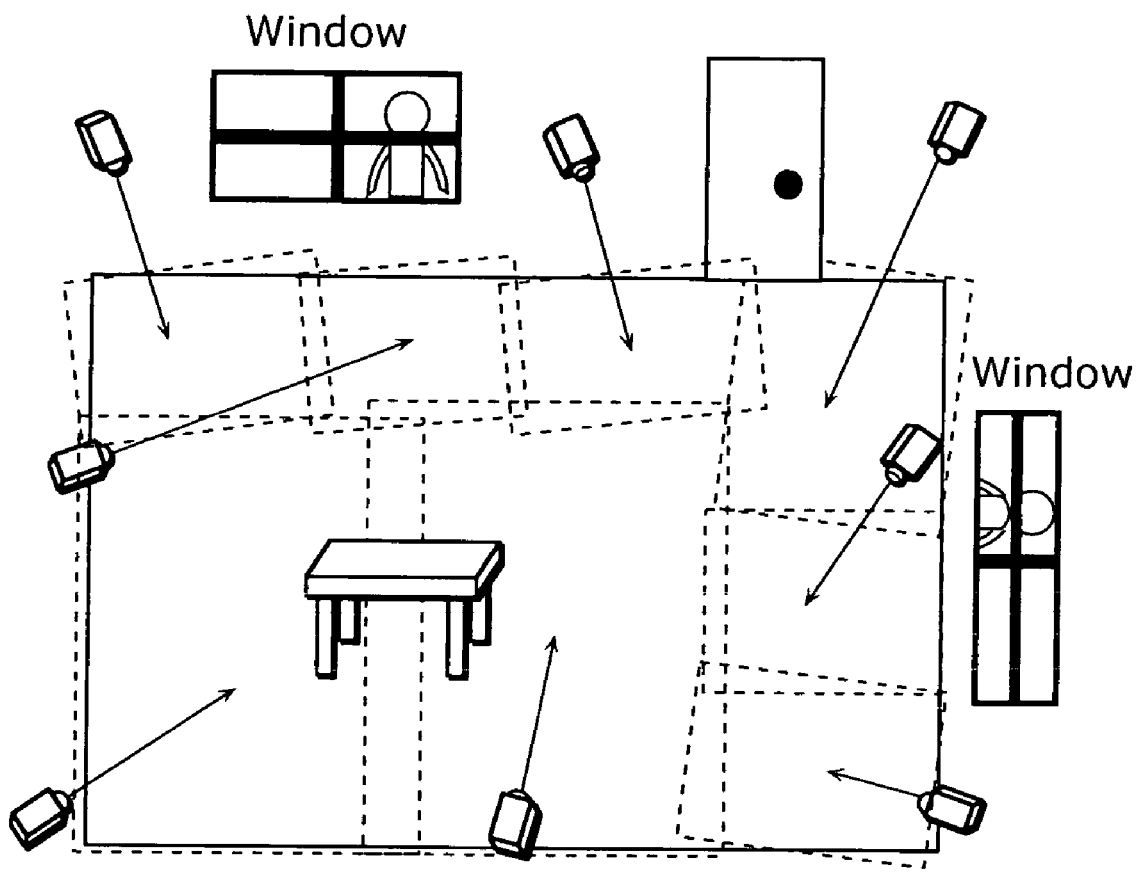
FIG. 17 is a diagram to explain motions of the camera in the first embodiment.

By using the controlling method explained up to this point, while the camera terminal 101, which is located in FIG. 13 for the area subject to monitoring provided by the map of the area subject to monitoring in FIG. 12A, shoots an area having a heavy resolution weight with higher resolution than other areas as shown in FIG. 17 according to the resolution weight map described in FIG. 12B, the camera terminal 101 can further adjust a location and resolution of the shooting area of all of the camera terminals 101 to shoot the whole area subject to monitoring.

In this way, a location important for monitoring according to a purpose of monitoring is predefined as a resolution weight map in the case monitoring is desired by changing an importance degree of monitoring by each location, for example, when an internal living room is monitored, any accessing area from the outside such as a window or a door needs to be monitored carefully than other areas to watch any intruder from the outside so that, by controlling plural PTZ cameras using a camera controlling device and controlling methods in the first embodiment, it is possible to automatically adjust the shooting area of those plural number of PTZ cameras to thoroughly shoot the whole area subject to monitoring while they shoot the important locations with higher resolution than the other locations.

Second Embodiment

Next, a second embodiment of the present invention is explained.

The camera terminal 101 of the first embodiment sets a difference in a resolution value between the camera terminals 101 according to importance per location and can shoot a whole area subject to monitoring by having each of the camera terminal 101 memorize locations of important area for monitoring as a resolution weight map. Additionally, the camera terminal 201 of the second embodiment makes a position pattern available in advance as plural resolution weight maps 121 for an area subject to monitoring of which position pattern of importance locations for monitoring is changed, and selects and uses the resolution weight map 121 according to a situation so that it realizes a monitoring system that can handle a situation where the position patter of importance locations for monitoring is changeable.

At first, a configuration of the camera terminal 201 in the second embodiment is explained. The camera terminal 201 in the second embodiment has the same basic configuration (the communication IF 103, the processing unit 104a, the storage unit 105a, the camera 106 and the camera controlling unit 107) as the first embodiment, however a function of the processing unit 104a and contents of the storage unit 105a are different from those in the first embodiment.

Figure 18:
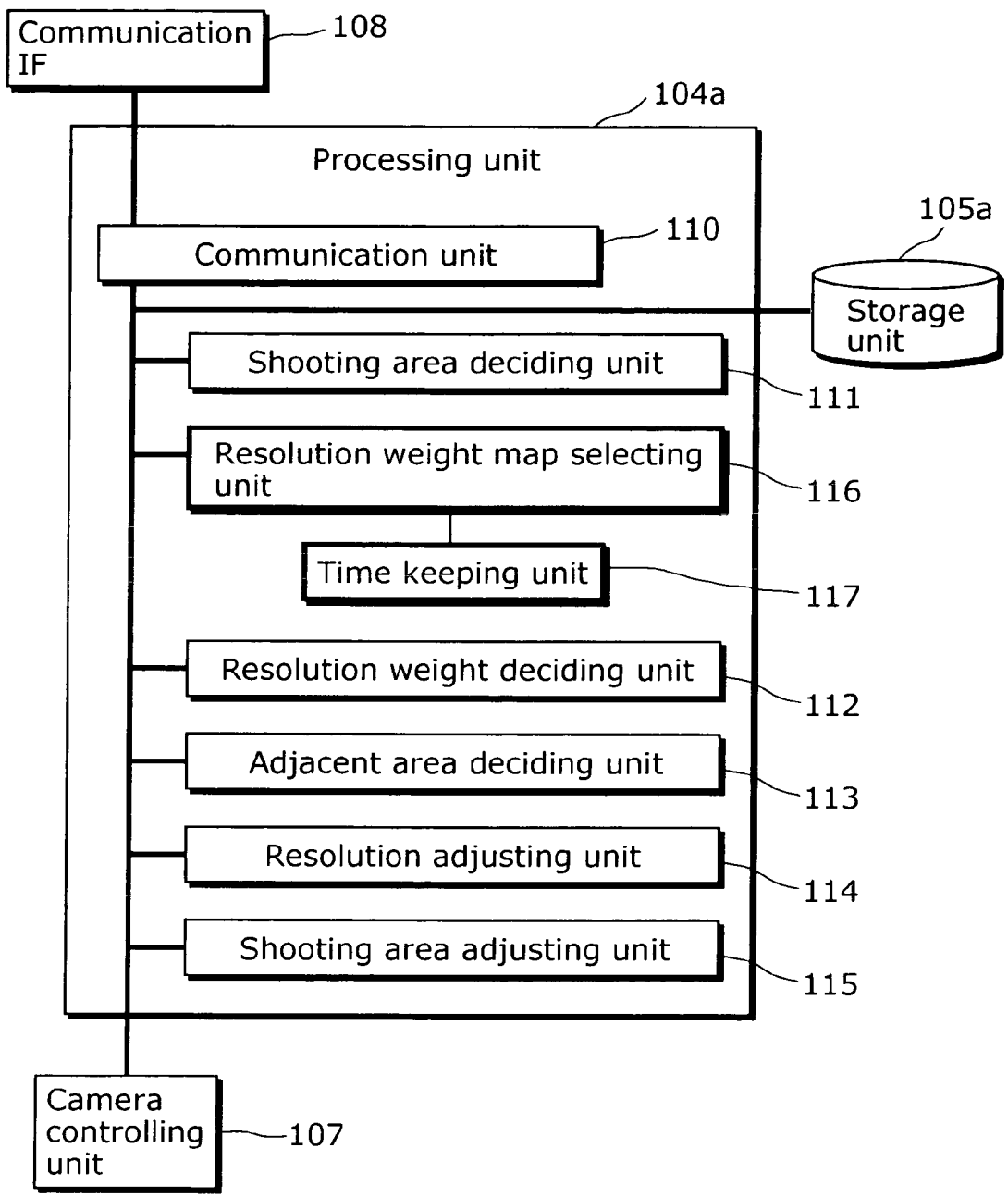
FIG. 18 is a block diagram to show a configuration of the processing unit in a second embodiment 2.

FIG. 18 shows a block diagram that indicates an internal configuration of the processing unit 104a for the camera terminal 201 in the second embodiment. The processing unit 104a includes a resolution weight map selecting unit 116 and a time keeping unit 117 in addition to the configuration of the processing unit 104 in the first embodiment. For a part having the same configuration as the first embodiment, the same symbols are used and explanation for those is omitted.

The resolution weight map selecting unit 116 is a processing unit that selects the resolution weight map 121 used by the resolution weight deciding unit 112 according to a certain set of rules. For example, it specifies a state of monitoring and selects a resolution weight map corresponding to the state of monitoring based on the specified state of monitoring and the rules defined in a resolution weight selection list that is explained later.

The time keeping unit 117 is a processing unit that obtains the current time.

In addition, there are the plural resolution weight maps 121 in the storage unit 105a of the camera terminal 201 in the second embodiment, and a resolution weight selection list 124 that defines which resolution weight map is used according to a monitoring state is memorized. An example of the resolution weight map 121 (Map 001 and Map 002) and the resolution weight selection list 124 memorized in the storage unit 105a within the second embodiment is provided in FIGS. 19 A to C. There are two maps, Map 001 and Map 002, available as the resolution weight map 121 in the second embodiment, and also, in the resolution weight selection list 124, a relationship between the shooting time as a selection criteria for the resolution weight map selecting unit 116 to select the resolution weight map 121 and the resolution weight map 121 to be selected is defined. Therefore, in the example of FIGS. 19 A to C, a rule is defined so that the resolution weight map 001 is selected when the time is from 7 to 19, and the resolution weight map 002 is selected when the time is from 19 to 7.

Next, a controlling method of the camera terminal 201 in the second embodiment is explained with reference to a flow chart in FIG. 20.

Figure 20:
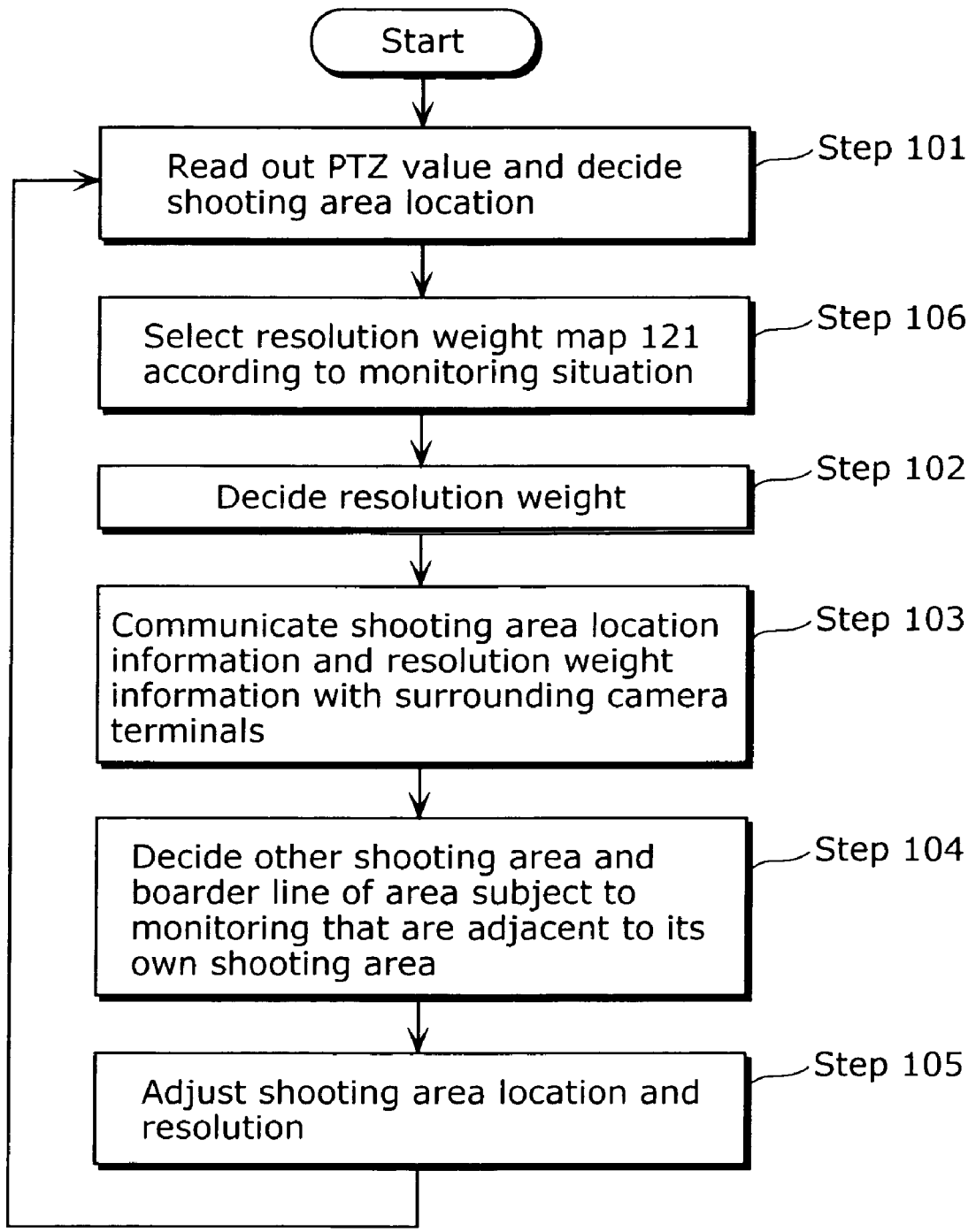
FIG. 20 is a flow chart that explains a controlling procedure of a camera terminal in the second embodiment.

FIG. 20 is the flow chart that shows a series of controlling method of the camera terminal 201 in the second embodiment. Hereinafter, the controlling method of the camera terminal 201 is explained according to each step in the flow chart. For the same controlling method as the first embodiment, the same symbols are used and explanation for those is omitted.

(Step 101)

It is the same control as the first embodiment.

(Step 106)

The resolution weight map selecting unit 116 obtains the current time from a time keeping unit, refers to the resolution weight selection list memorized in the storage unit 105a, and selects the resolution weight map 121 to be referred at the current time.

(Step 102)

The resolution weight deciding unit 112 decides a resolution weight according to the same controlling method as the camera terminal 101 in the first embodiment by using the resolution weight map 121 selected in the resolution weight map selecting unit 116.

From (Step 103) to (Step 105)

They are the same control as the first embodiment.

Figure 21:
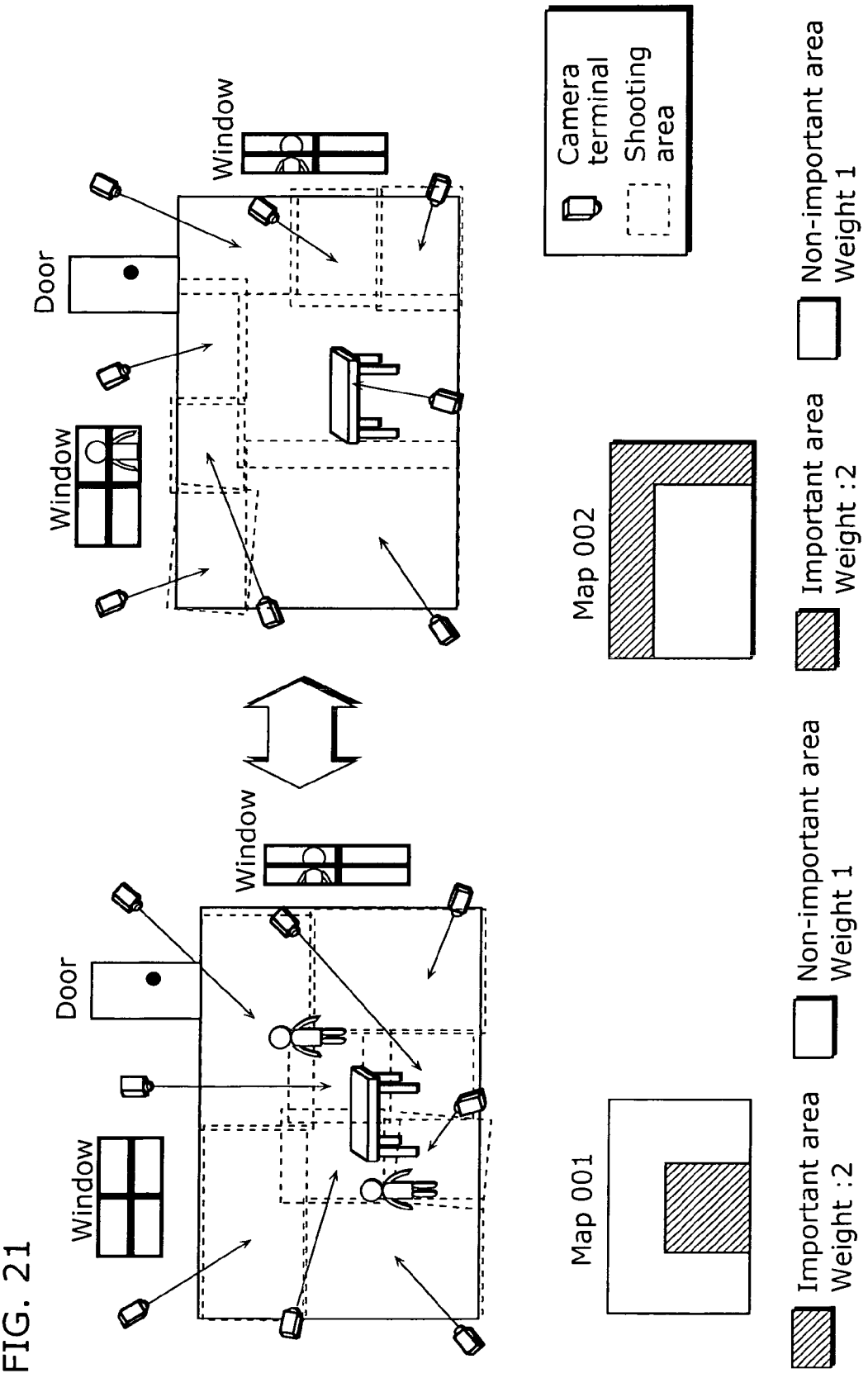
FIG. 21 is a diagram that shows operations of the camera terminal in the second embodiment.

For example, in a room having a rectangle floor shape as shown in FIG. 13, when eight sets of the camera terminals 201 are installed at a ceiling in a fixed height level to monitor the floor in the room as an area subject to monitoring, the resolution weight map 121 (Map 001 and Map 002) in FIG. 19 and the resolution weight selection list 124 are provided to the storage unit 105a in each of the camera terminals 201 so that, from 19:00 to 7:00 when an inhabitant is in the room, they mainly monitor a table area where the inhabitant frequently uses to easily monitor a condition or behavior of the inhabitant, and from 7:00 to 19:00 when the inhabitant is not in the room, they mainly monitor an accessing area to the room for a security measure. By using the controlling method explained up to this point, it is possible to automatically adjust a position and resolution of the shooting area of each of the camera terminals 201 to shoot a location with a high degree of importance designated in advance as a high resolution image according to a change in the shooting time as shown in FIG. 21.

In this way, by controlling plural PTZ cameras using the camera controlling device and the controlling method in the second embodiment, even in the case a positioning pattern of the important location is changed as the time passes by when a room or such is monitored, it is possible to constantly shoot an important area with high resolution according to a change in the positioning pattern while they automatically adjusts the shooting area of the plural number of PTZ cameras to thoroughly shoot the entire area subject to monitoring.

In the second embodiment, an example to select the resolution weight map 121 based on the time information obtained by the time keeping unit 117 was provided. However, other than that, the resolution weight map 121 may be selected by a day of the week or a date. Also, in addition to selection of the resolution weight map 121 made by a date or/and time, for example, a relationship between the resolution weight map 121 and a locking condition of a key for a door or a condition of human presence can be defined in the resolution weight selection list 124 so that a resolution weight map selecting unit may detect the locking condition of the key for the door or the condition of human presence through a camera or other sensor, and so on, and change the resolution weight map 121 according to the detected contents.

Third Embodiment

Next, the third embodiment of the present invention is explained. By deciding an important point in monitoring by each location within an area subject to monitoring, the camera terminal 101 in the first embodiment shoots a whole area subject to monitoring while it makes a difference in resolution according to the importance of the location shot by each of the camera terminal 101.

Moreover, in the case a monitoring importance is depended on whether a specific object exists in a camera view rather than a location to meet with a monitoring purpose, a camera terminal 301 in the third embodiment decides a resolution weight depending on whether the object is taken in a shooting image or not so that a camera terminal 301 realizes a monitoring system that shoots a whole area subject to monitoring by making a difference in resolution of each of the camera terminal 301 according to presence or a location of the object.

At first, a configuration of the camera terminal 301 in the third embodiment is explained. The camera terminal 301 in the third embodiment has the same basic configuration (the communication IF 103, the processing unit 104b, the storage unit 105b, the camera 106 and the camera controlling unit 107) as the camera terminal 101 in the first embodiment, a function of the processing unit 104b and contents of the storage unit 105b are different from those in the first embodiment.

Figure 22:
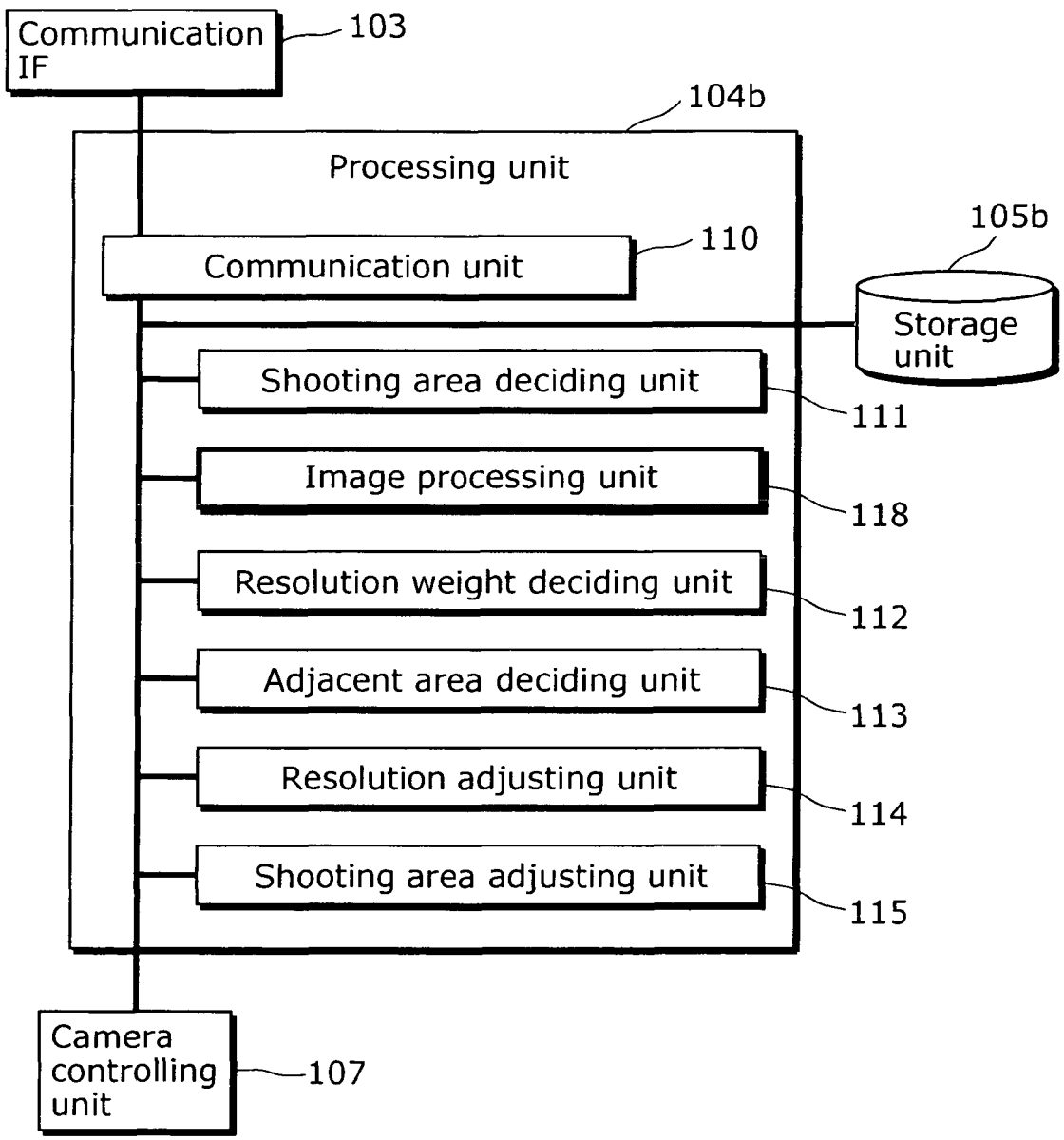
FIG. 22 is a block diagram that shows a configuration of a processing unit in a third embodiment.

FIG. 22 shows a block diagram to show an internal configuration of the processing unit 104b of the camera terminal 301 in the third embodiment. In addition to a configuration of the processing unit 104b in the first embodiment, the processing unit 104 includes an image processing unit 118. For those having the same configuration as the first embodiment, the same symbols are assigned and explanation of those is omitted.

The image processing unit 118 is a processing unit that extracts a characteristic of an image shot by the camera 106 and decides whether it is an image having a similar characteristic as one in a template image available in advance.

In addition, there is a template image 125 in the storage unit 105b of the camera terminal 301 in the third embodiment as shown in FIGS. 23 A to C, and also there is a template image list 126 that defines a resolution weight by each of the template image 125.

In the third embodiment, there are images of a desk and an upper half of a human body as the template image 125 shown in FIGS. 23 A and B. Also, the template image list 126 shown in FIG. 23 C defines a resolution weight of the desk as 2 and a resolution weight of the human figure as 3. In addition, a resolution weight of any location where an object defined in the template images is not shot in a shooting image is defined as 1.

Next, a controlling method of the camera terminal 301 in the third embodiment is explained with reference to a flow chart in FIG. 24

Figure 24:
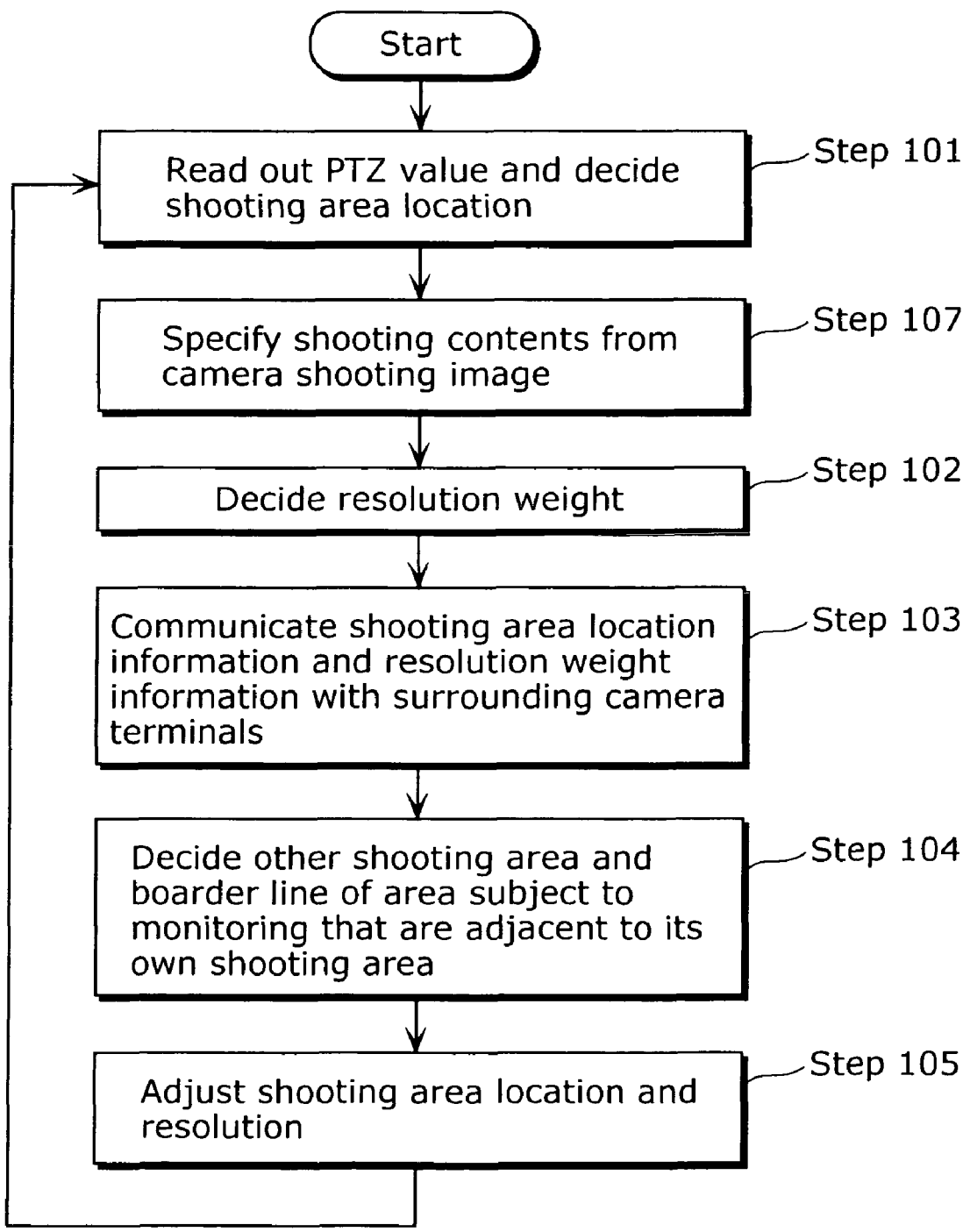
FIG. 24 is a diagram to show a data example that is memorized in a storage unit in the third embodiment.

FIG. 24 is a flow chart that shows a series of controlling method of the camera terminal 301 in the third embodiment.

Hereinafter, the controlling method of the camera terminal 301 is explained according to each step in the flow chart. For those having the same controlling method as the first embodiment, the same symbols are used and explanation of those is omitted.

(Step 101)

It is the same control as the first embodiment.

(Step 107)

The image processing unit 118 decides whether there is an area having a characteristic similar to the template image memorized in the storage unit 105b or not from images shot by the camera 106. An algorithm such as a template matching method, and so on may be used as a method to decide whether there is an area having a characteristic similar to the template image memorized in the storage unit 105b or not from images shot of the camera 106

(Step 102)

In the case it is decided in the image processing unit 118 that there is an object having a characteristic same as the template image a shooting area, the resolution weight deciding unit 112 decides a resolution weight corresponding to the template image 125 selected from the template image list 126 memorized in the storage unit 105b.

From (Step 103) to (Step 105)

They are the same control as the first embodiment.

Figure 25:
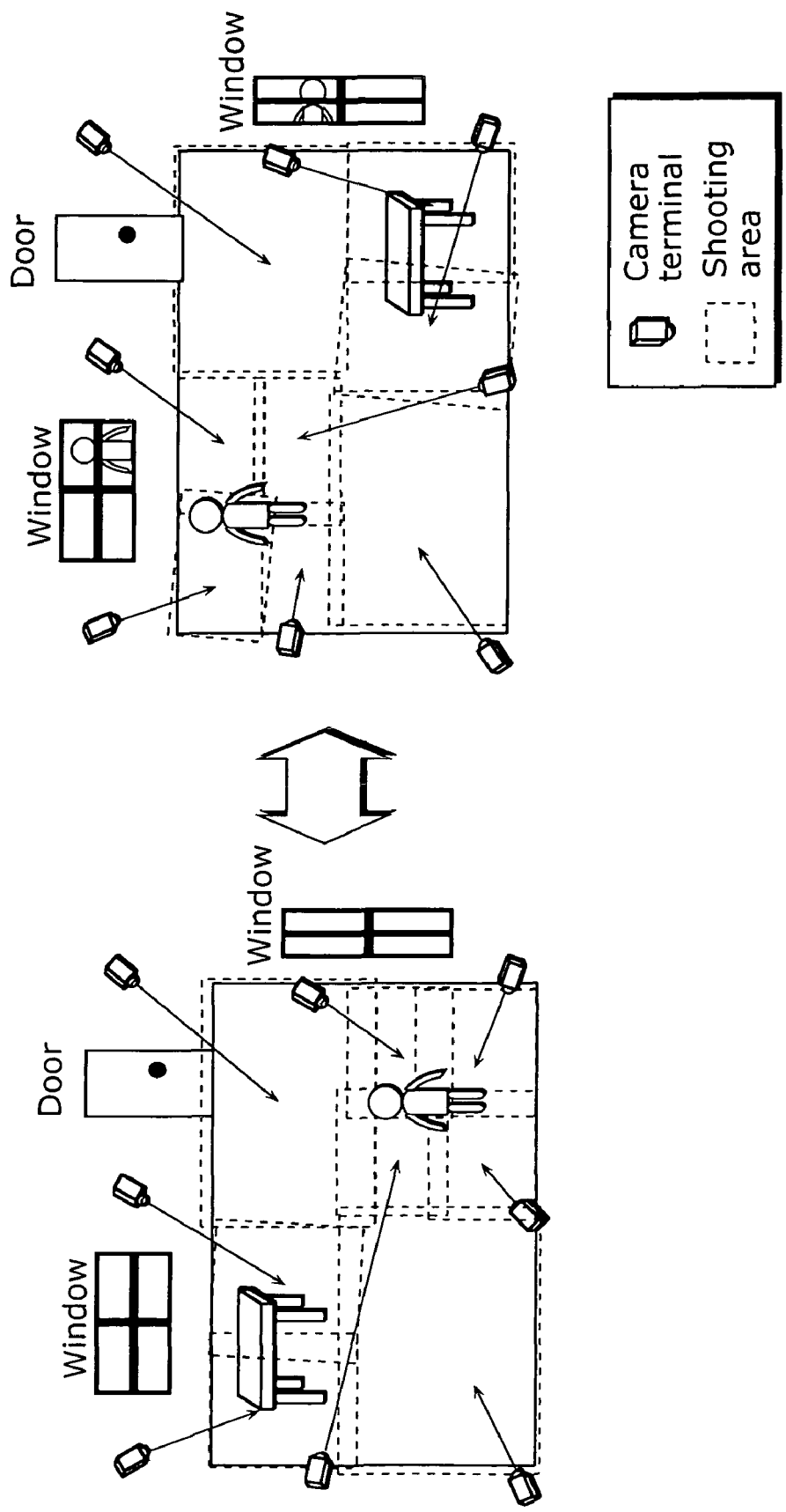
FIG. 25 is a diagram that explains motions of a camera terminal in the third embodiment.

By using the controlling method explained up to this point, for example, when the camera terminal 301 is installed at a ceiling in a room as shown in FIG. 13 and monitors a room floor as an area subject to monitoring, the template image 125 of a desk and a person shown in FIGS. 23 A and B and the template image list 126 shown in FIG. 23 C, which defines a resolution weight of each of the template image 125 are provided to the storage unit 105b in each of the camera terminal 301 so that, in the case there are a desk and a person having the same characteristic as the one of the template image 125 in the shooting area of the camera terminal 301, it is possible to shoot the objects according to the resolution weight and the location assigned to the desk and the person as shown in FIG. 25 as well as automatically adjusting the shooting areas of the plural camera terminals 301 to thoroughly shoot a whole area subject to monitoring.

In this way, by controlling plural PTZ cameras using the camera controlling device and the controlling method in the third embodiment, even in the case a monitoring importance is depended on presence of a certain object taken in a shooting image of the PTZ camera rather than a specific location, and a location of the object may be changed, it is possible to shoot the certain object with higher resolution than other surrounding area as long as information that defines a characteristic of an object mainly monitored and a resolution weight used for shooting that object are provided, while the shooting area of the plural number of the PTZ cameras is automatically adjusted to thoroughly shoot the entire area subject to monitoring.

In the third embodiment, image data that records a characteristic such as a shape of a desk or a personal shape that need to be monitored mainly as the template image 125. However, other than that, the template image 125, and so on that can indirectly specify existence of some object may be used. For instance, by using the template image 125 that records a characteristic such as floor color or a design, it is possible to decide existence of some object in that location when some color or design other that the template image 125 is detected.

Furthermore, the camera terminal 301 in the third embodiment may be a camera controlling device and a controlling method, which memorizes the resolution weight map 121 and the resolution weight selection list 124 in the second embodiment in the storage unit 105b, and additionally includes the resolution weight map selecting unit 116 so that it can adjust a location and resolution of the shooting area of the camera terminal according to a relationship between the location and the object by combining an importance degree by each location in the area subject to monitoring with the importance of the object moved to an image of the camera terminal 401. By doing so, for example, even if the location concerned is important for monitoring, its importance degree of the location where there is a guard (the object) may be lowered, and on the contrary, even if the location concerned is less important, its importance degree of a location where there is some suspicious person may be upgraded.

Fourth Embodiment

Next, the fourth embodiment of the present invention is explained.

There is a positioning pattern of the area mainly monitored for monitoring as the resolution weight map in advance in the camera terminal 101 in the first embodiment and the camera terminal 201 in the second embodiment. In the case that a situation assumed may become complicated by a subject to monitoring and the resolution weight map cannot be prepared for every situation, the camera terminal 401 in the fourth embodiment automatically creates the resolution weight map 121 from contents of its shooting image, and by using this, specifies a positioning pattern of an important area even for a situation not assumed in advance so that it is possible to constantly shoot an important area with higher resolution than other surrounding area according to this while it adjusts the shooting areas of plural camera terminals 401 to thoroughly shoot the entire area subject to monitoring.

A configuration of the camera terminal 401 in the fourth embodiment is explained. The camera terminal 401 in the fourth embodiment has the same configuration (the communication IF 103, the processing unit 104c, the storage unit 105c, the camera 106 and the camera controlling unit 107) as the camera terminal 101 in the first embodiment, however a function of the processing unit 104c and contents of the storage unit 105c are different from the first embodiment.

Figure 26:
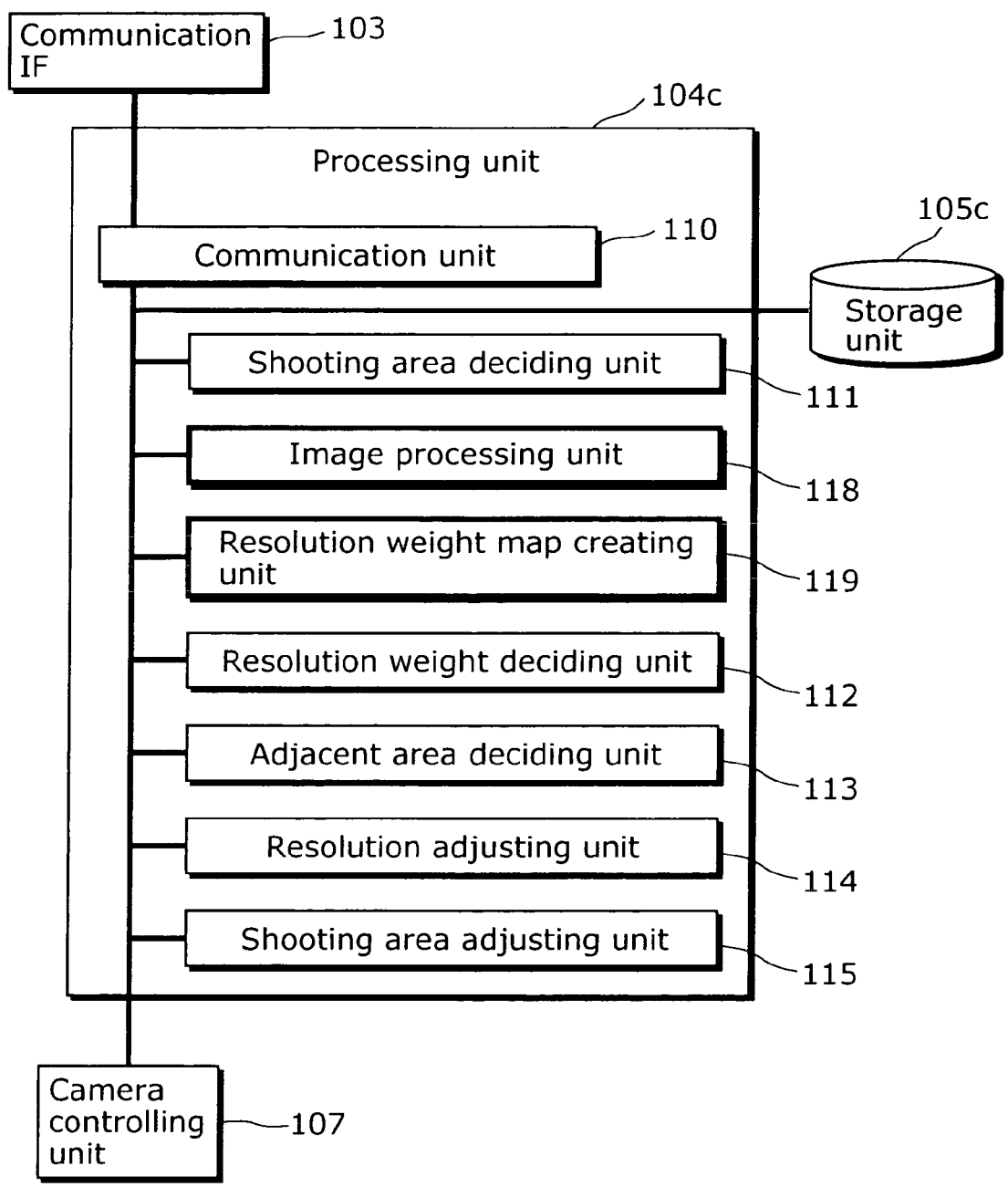
FIG. 26 is a block diagram that shows a configuration of a processing unit in a fourth embodiment.

FIG. 26 shows a block diagram that indicates an internal configuration of the processing unit 104c of the camera terminal 401 in the fourth embodiment. In addition to the processing unit 104b in the third embodiment, the processing unit 104c includes a resolution weight map creating unit 119. For those having the same configuration as the first embodiment, the second embodiment and the third embodiment, the same symbols are assigned and explanation of those is omitted.

The resolution weight map creating unit 119 is a processing unit that updates a value on the resolution weight map 121 according to a certain rule for a shooting area analyzed by the image processing unit 118, and to be more in detail, it creates the resolution weight map from the shooting image of the camera 106 according to a creation rule of the resolution weight map, which is explained later.

Also, there is a resolution weight map creation rule 127 that defines a rule for creating the resolution weight map in the storage unit 105c of the camera terminal 401 in the fourth embodiment. An example of the resolution weight map creation rule 127 in the fourth embodiment is shown in FIG. 27. In the resolution weight map creation rule 127 in FIG. 27, a resolution weight is set as 2 for any location a person is detected in the image processing unit 118 for 80% or more of the last 5 minutes, and a resolution weight is set as 2 for any location for less than 80% of the last 5 minutes.

Next, a controlling method of the camera terminal 401 in the fourth embodiment is explained with reference to a flow chart in FIG. 28.

Figure 28:
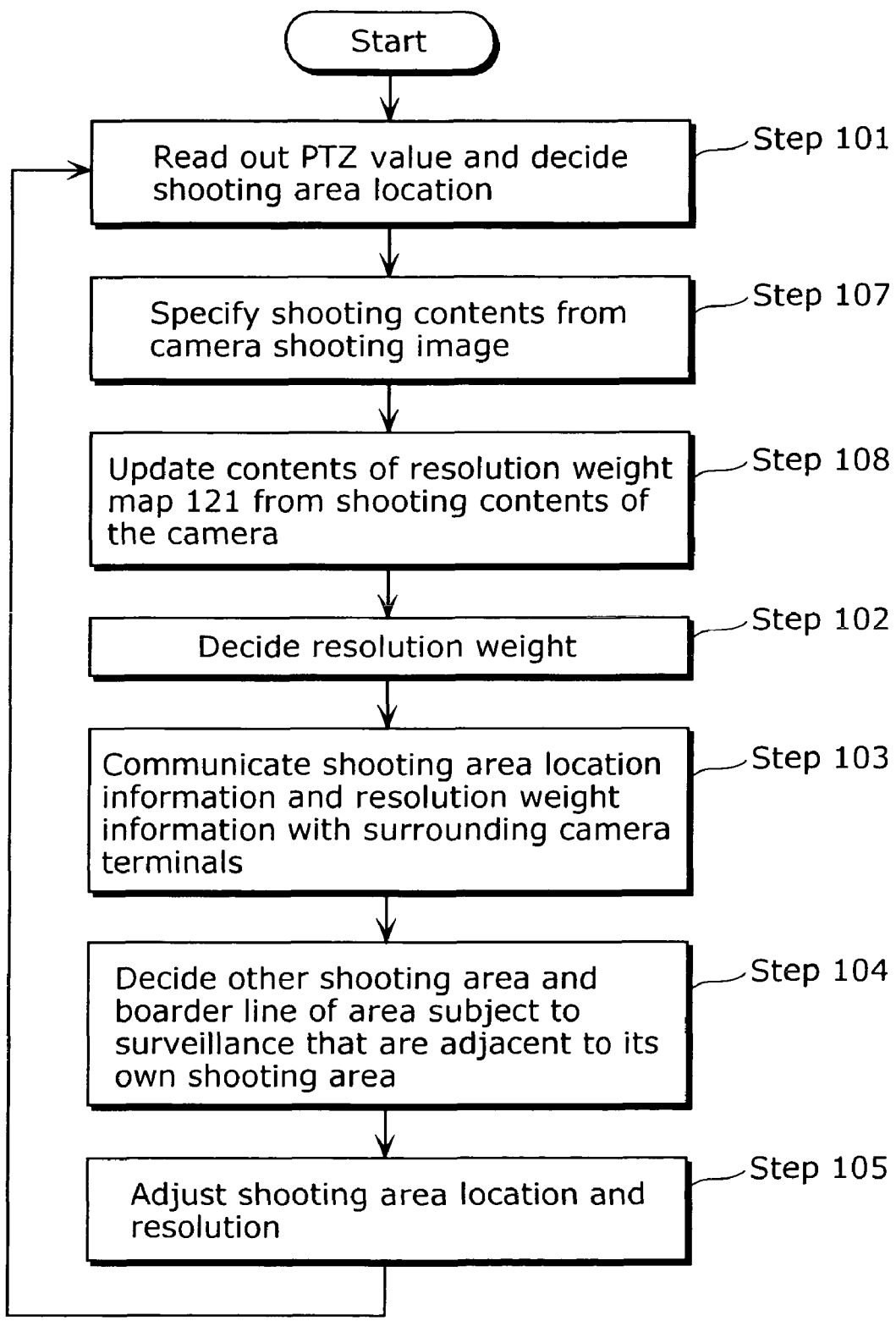
FIG. 28 is a flow chart that explains a controlling procedure of a camera terminal in the fourth embodiment.

FIG. 28 is a flow chart that shows a series of controlling method of the camera terminal 401 in the fourth embodiment. Hereinafter, the controlling method of the camera terminal 401 is explained according to each step of the flow chart. For the same controlling method as the first embodiment, the second embodiment and the third embodiment, the same symbols are assigned and explanation of those is omitted.

(Step 101)

It is the same control as the first embodiment.

(Step 107)

The image processing unit 118 decides whether there is an area having a characteristic similar to the one of the template image 125 memorized in the storage unit 105c from images shot by the camera 106.

(Step 108)

The resolution weight map creating unit 119 updates contents of the resolution weight map 121 memorized in the storage unit 105c according to a situation in the area subject to monitoring decided by the image processing unit 118 and contents of the resolution weight map creation rule 127 memorized in the storage unit 105c. The resolution weight map creating unit 119 updates contents of a location corresponding to an area shot by itself among the resolution weight map 121. For example, the resolution weight map creating unit 119 sets 2 as a resolution weight for a location a person is detected for 80% or more of the last 5 minutes, and sets 1 as a resolution weight for a location for less than 80% of the last 5 minutes.

(Step 102)

It is the same control as the first embodiment.

(Step 103)

Through the communication unit 110, mutual shooting area location information 122, resolution weight information 123 and furthermore information of a part of contents updated by itself among the resolution weight map 121 are exchanged with surrounding camera terminal 401a, and information is shared with an other camera terminal 401a.

From (Step 104) to (Step 105)

They are the same control as the first embodiment.

Figure 30A:
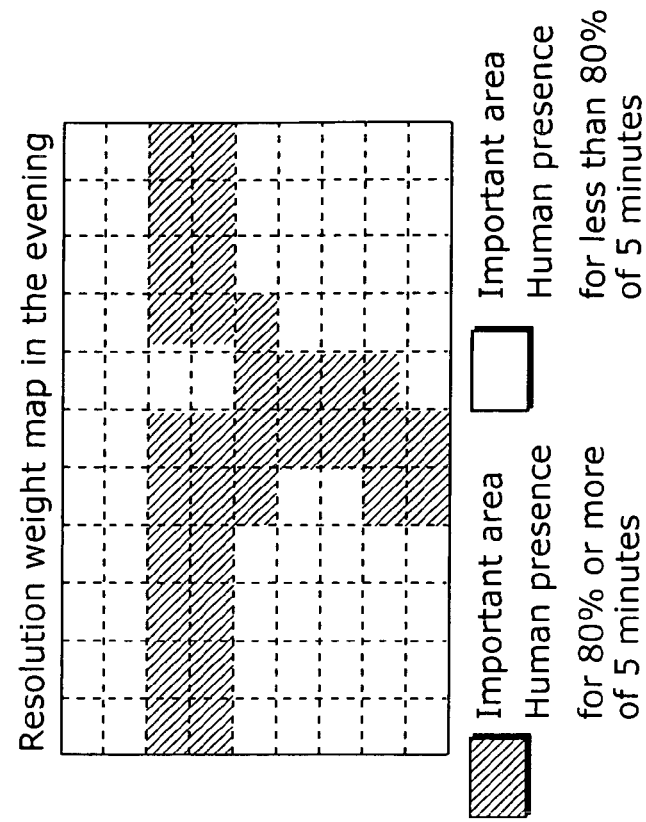
FIGS. 30A and 30B explain motions of a camera terminal in the fourth embodiment.
Figure 30B:
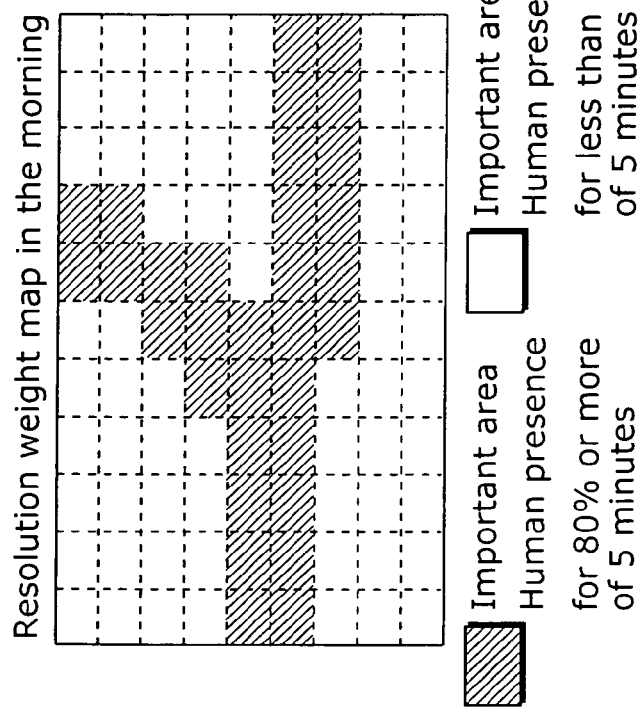
Figure 31:
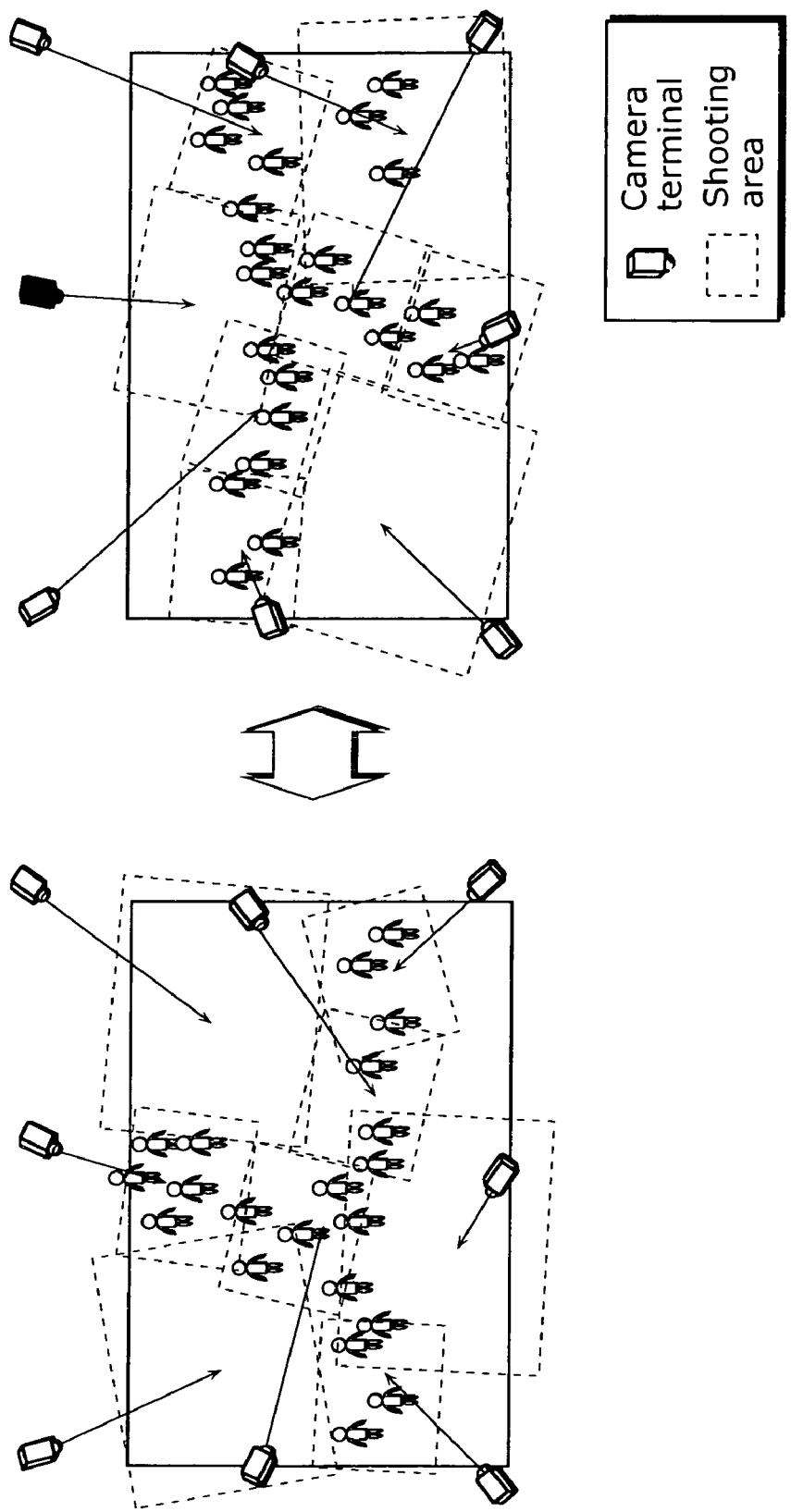
FIG. 31 is a diagram that explains motions of a camera terminal in the fourth embodiment.

By using the controlling method explained up to this point, for example, in the case the plural camera terminals 401 are installed at a location in certain height appropriate for shooting an area subject to monitoring, at some location such as a platform, as shown in FIG. 29, at a station where there are many people for transfer, and moreover a template 001 shown in FIG. 23 and the resolution weight map creation rule 127 shown in the diagram are provided to the camera terminal 401, the camera terminal 401 specifies an object having a human shape provided as the template 001 at the image processing unit 118, and furthermore change contents of the resolution weight map 121 to make the resolution weight be 2 at a location where there has been the human shape object for 4 minutes or more in the last 5 minutes, and the resolution weight be 1 at any location other than above. In addition, the camera terminal 401 changes contents of the resolution weight map of the entire area subject to monitoring according to a change in a flow of people by sharing information of the resolution weight map 121 changed by the other camera terminal 401. In this way, for example, for each of the situation shown in a left diagram of FIG. 29 and a right diagram of FIG. 29, the resolution weight map 121 like FIG. 30 A and FIG. 30 B is automatically created and shared among all of the camera terminals 401. Also, based on the resolution weight map 121 created, the plural number of the camera terminals 401 shoot a location where people often go through (a crowded location) with high resolution according to the flow of people as shown in a left diagram in FIG. 31 and a right diagram in FIG. 31 by adjusting the location and the resolution in mutual shooting area while they shoot the entire area subject to monitoring.

In this way, by controlling plural PTZ cameras using the camera controlling device and the controlling method in the fourth embodiment, even in the case a change in a positioning pattern for an area highly important for monitoring, such as a case a flow of people at a transfer platform at a station, it is possible grapes the positioning pattern for an area highly important for monitoring based on contents of shooting images, and automatically adjust the shooting area of the plural number of PTZ cameras to constantly shoot an area more important for monitoring than its surrounding area as an image with high resolution according to the positioning pattern, while they thoroughly shoot the entire area subject to monitoring.

The camera terminal 401 in the fourth embodiment may have a monitoring system itself memorize (learn) a relationship between a situation of the area subject to monitoring (a decision condition) and its handling method (the resolution weight map) by memorizing the resolution weight map 121 created by the resolution weight map creating unit 119 and the resolution weight selection list 124, which is a situation recorded as a decision condition when the resolution weight map 121 is created, and further including the resolution weight map selecting unit 116 in the second embodiment.

In this way, for example, at the transfer platform of a station during business rush hours, in the case a flow of people changes every time a train for various lines arrives and the flow of people is fixed by each line of an arriving train, a relationship between arriving time of the train and a location where a probability of people's presence becomes high after arrival can be described in the resolution weight map 121 and the resolution weight selection list 124 and memorized (learned) in each of the camera terminal 401 so that it is possible to adjust the camera terminal 401 quickly corresponding to the change in the situation (the flow of people) by using the previously created resolution weight map rather than creating the resolution weight map every time.

Figure 32:
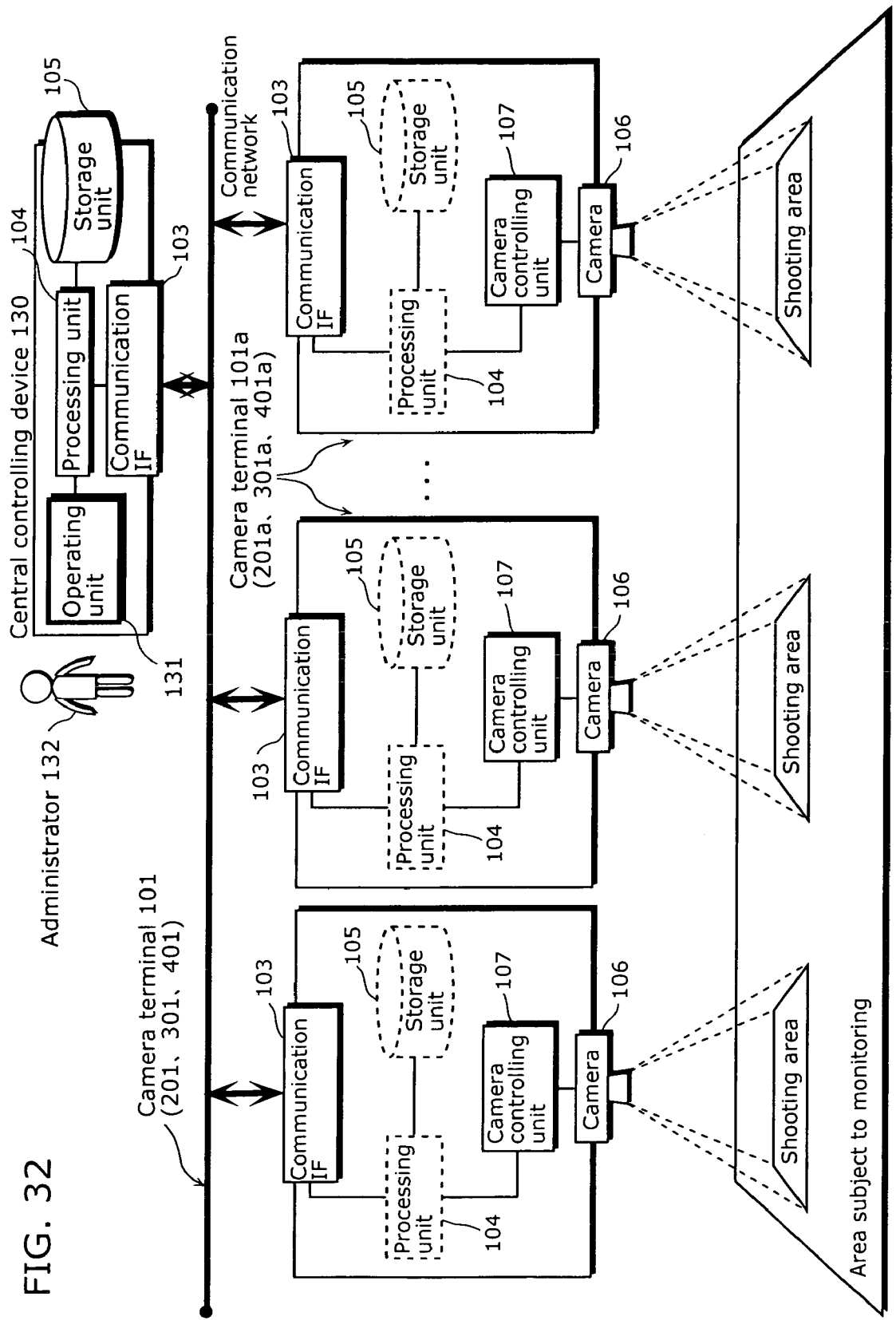
FIG. 32 is a block diagram that shows a configuration of a monitoring system related to the present invention.

Additionally, in the first to fourth embodiments, explanation was given in the case each camera terminal is activated in a self-directive manner according to its surrounding camera terminal and a state of the area subject to monitoring as an example. However, as shown in FIG. 32, it may have a configuration having a centrally controlling device 130 that centrally monitors plural camera terminals such as shown in FIG. 32. The monitoring system shown in FIG. 32 has a configuration that have a processing unit and a storage unit included in each camera terminal in the first to fourth embodiments at one location within the centrally controlling device 130. In FIG. 32, for the same configuration as the one in FIG. 9, the same numbers are assigned and explanation for those is omitted.

An operating unit 131 is an user interface that instructs a process to change contents of the resolution weight map 121 memorized at the storage unit 105 within the monitoring system directly by an administrator 132.

By using a centrally controlling type of a configuration like this, the administrator 132 can designate or cancel an area to be mainly monitored by directly selecting the resolution weight map 121 recorded in the storage unit 105 of the centrally controlling device 130 or editing contents of the resolution weight map 121.

Also, in the case a combination of a pan angle, a tilt angle, a focal distance, and so on for all of camera terminals can be predetermined to satisfy a targeted monitoring condition for a positioning pattern of an area important for monitoring within an area subject to monitoring, it may be a configuration to prepare a plural piece of preset information 128, which defines the combination of a pan angle, a tilt angle and a focal distance, and so on as shown in FIGS. 33 A and B instead of the resolution weight map 121, and a preset selection list 129, which defines a condition to select the preset information 128, in the storage unit 105 of the centrally controlling device 130, and to selects the preset information 128 based on the preset selection list 129 in the same way as selection of the resolution weight map according to the resolution weight map selecting unit 116 located in the centrally controlling device 130, and to directly adjust to values of the pan angle, the tilt angle and the focal distance described in the selected preset information 128 via the camera controlling unit 107 of each camera terminal. Even in the case such preset information 128 is used, in the same way as the case using the resolution weight map 121, if the positioning pattern for an important location is changed as the time goes by for monitoring, for example, in a room, it is possible to shoot an area importance for monitoring according to time as a higher resolution image than its surrounding area as well as shooting the entire area subject to monitoring.

(Supplemental Explanation)

Next, as supplemental explanation, a calculation method of a shooting area 2111 of the camera terminal 101~401 described in the first to fourth embodiments is explained.

Figure 34:
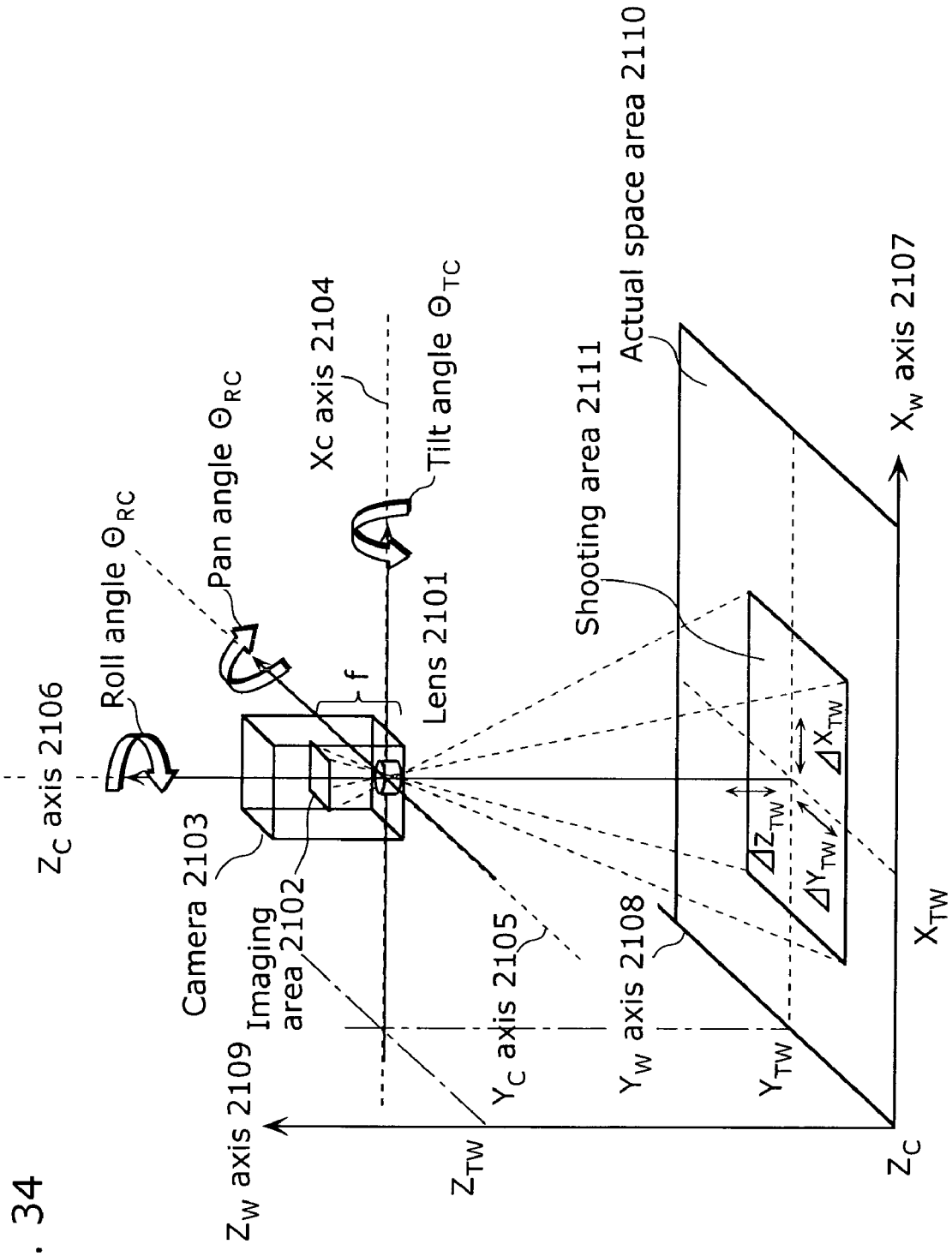
FIG. 34 is an explanatory diagram for calculating a shooting area in a supplementary explanation 1 of the present invention.

FIG. 34 is a diagram to explain the calculation method of the shooting area 2111 of the camera terminals 101~401. In FIG. 34, a camera 2103 includes a lens 2101 and a shooting image surface 2102 corresponding to the camera 106 of the camera terminals 101~401 in the first to fourth embodiments. $X_c$ axis 2104, $Y_c$ axis 2105 and $Z_c$ axis 2106 are mutually perpendicular, and consist of a camera coordinate axis system having a lens 201 as their origin. The camera 2103 conducts pan rotation (around $Y_c$ axis 2105), tilt rotation (around $X_c$ axis 2104) and roll rotation ($Z_c$ axis 2106) around each axis. Each of rotation angles is respectively indicated as $\Theta_{pc}$, $\Theta_{TC}$, $\Theta_{RC}$. The shooting image surface 2102 is at a position f distance away from the lens 2101 in the $Z_c$ axis 2106 direction, and is 2W×2H in size. $Z_w$ axis 2107, $Y_w$ axis 2108 and $Z_W$ axis 2109 are mutually perpendicular, and consist of world coordinate system. $X_w$ axis 2107 is equivalent to はX$_w$ axis 120 shown in FIG. 9 and $X_w$ axis 1120 shown in FIG. 29, and $Z_w$ axis 2109 is equivalent to $Z_w$ axis 122 shown in FIG. 9 and $Z_W$ axis 1122 in FIG. 29. The camera 2103 is located at a position of (XT, YT, ZT) indicated in the world coordinate system, and is moved by ($\Delta X_{TW}$, $\Delta Y_{TW}$, $\Delta Z_{TW}$) using this position as an origin.

A point, (XC, YC, ZC) on the camera coordinate system consisting of $X_c$ axis 2104, $Y_c$ axis 2105 and $Z_c$ axis 2106 can be converted to a point ($X_W$, $Y_W$, $Z_w$) on the world coordinate consisting of $X_W$ axis 2107, $Y_W$ axis 2108 and $Z_W$ axis 2109 according to the following formula 11.

[Mathematical Expression 11]

$$\begin{pmatrix} X_W \\ Y_W \\ Z_W \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} X_C \\ Y_C \\ Z_C \end{pmatrix} + \begin{pmatrix} X_{TW} \\ Y_{TW} \\ Z_{TW} \end{pmatrix} + \begin{pmatrix} \Delta X_W \\ \Delta Y_W \\ \Delta Z_W \end{pmatrix}$$ (Formula 11)

In this formula, a 3×3 matrix value using M00 to M22 as an element indicates a matrix value of an attitude reference point (a rotation angle of an attitude of the camera 2103 ($\Theta_{PC}$, $\Theta_{TC}$, $\Theta_{RC}$)=(00, 0)) of the camera 2103, a 3×3 matrix value using R00 to R22 as an element indicates a matrix value of the attitude reference point of the camera 2103, $(X_{TW}, Y_{TW}, Z_{TW})$ indicates a location of a location reference point (displacement $(\Delta X_{TW}, \Delta Y_{TW}, \Delta Z_{TW}) = (0, 0, 0)$ of the location of the camera 2103) of the camera 2103, and $(\Delta X_{TW}, \Delta Y_{TW}, \Delta Z_{TW})$ indicates location displacement from the location reference point of the camera 2103.

It is possible to calculate with a calibration method shown in the following literature 1 by making a 3×3 matrix value having $M_{00}$ to $M_{22}$ as an element and $(X_{TW}, Y_{TW}, Z_{TW})$ adjust the camera 2103 to an attitude reference point and a position reference point, or setting an attitude and a location of the current camera 2103 are respectively as an attitude reference point and a position reference point so that it is calculated in advance before the detection area adjusting device of the present invention is activated.

Non-Patent Literature 1

R. Tsai. A Versatile Camera Calibration Technique for High-Accuracy 3D Machine Vision Metrology Using Off-the-Shelf TV Camera and Lenses. IEEE journal of Robotics and Automation, Vol. RA-3, No. 4, pp. 323-344, 1987

As shown in the following formula 12, the 3×3 matrix value having $R_{00}$ to $R_{22}$ having an element can be calculated through the rotation angle $(\Theta_{PC}, \Theta_{TC}, \Theta_{RC})$, which is an attitude of the camera 2103.

[Mathematical Expression 12]

$$\begin{pmatrix} R_{00} & R_{01} & R_{02} \\ R_{10} & R_{11} & R_{12} \\ R_{20} & R_{21} & R_{22} \end{pmatrix} = \begin{pmatrix} \cos\Theta_{RC} & \sin\Theta_{RC} & 0 \\ -\sin\Theta_{RC} & \cos\Theta_{RC} & 0 \\ 0 & 0 & 0 \end{pmatrix}$$
$$\begin{pmatrix} 1 & 0 & 0 \\ 0 & \cos\Theta_{TC} & \sin\Theta_{TC} \\ 0 & -\sin\Theta_{TC} & \cos\Theta_{TC} \end{pmatrix} \begin{pmatrix} \cos\Theta_{PC} & 0 & -\sin\Theta_{PC} \\ 0 & 1 & 0 \\ \sin\Theta_{PC} & 0 & \cos\Theta_{PC} \end{pmatrix}$$ (Formula 12)

The rotation angle $(\Theta_{PC}, \Theta_{TC}, \Theta_{RC})$ is read by the camera controlling unit 107 in the first to fourth embodiments 1 to 4 of the present invention.

If $(\Delta X_{TW}, \Delta Y_{TW}, \Delta Z_{TW})$, which is location displacement from a position reference point of the camera 2103, is functioned to displace the location of this camera 2103 by a stepping motor, and so on, its displacement can be read by the stepping motor.

Each point of $(X_{PC}, Y_{PC})$ non the shooting image surface 2102 is projected to $(X_{PW}, Y_{PW}, Z_{PW})$ on an actual space area 2110 through the following formulas 13, 14 and 15.

[Mathematical Expression 13]

$$\begin{pmatrix} X_{PW} \\ Y_{PW} \\ Z_{PW} \end{pmatrix} = \begin{pmatrix} X_O + \frac{(Z_O - Z_C)X_D}{Z_D} \\ Y_O + \frac{(Z_O - Z_C)Y_D}{Z_D} \\ Z_C \end{pmatrix}$$ (Formula 13)

[Mathematical Expression 14]

$$\begin{pmatrix} X_O \\ Y_O \\ Z_O \end{pmatrix} = \begin{pmatrix} X_{TW} \\ Y_{TW} \\ Z_{TW} \end{pmatrix} + \begin{pmatrix} \Delta X_W \\ \Delta Y_W \\ \Delta Z_W \end{pmatrix}$$ (Formula 14)

[Mathematical Expression 15]

$$\begin{pmatrix} X_D \\ Y_D \\ Z_D \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} X_{PC} \\ Y_{PC} \\ f \end{pmatrix}$$ (Formula 15)

Therefore, $(-W, -H, f), (-W, -H, f), (-W, -H, f), (-W, -H, f)$ at 4 corners of the imaging area is projected on the actual space area 2110 through the following formulas 16, 17, 18 and 19.

[Mathematical Expression 16]

$$\begin{pmatrix} X_{PW0} \\ Y_{PW0} \\ Z_{PW0} \end{pmatrix} = \begin{pmatrix} X_O + \frac{(Z_O - Z_C)X_{D0}}{Z_{D0}} \\ Y_O + \frac{(Z_O - Z_C)Y_{D0}}{Z_{D0}} \\ Z_C \end{pmatrix}$$ (Formula 16)

[Mathematical Expression 17]

$$\begin{pmatrix} X_{PW1} \\ Y_{PW1} \\ Z_{PW1} \end{pmatrix} = \begin{pmatrix} X_O + \frac{(Z_O - Z_C)X_{D1}}{Z_{D1}} \\ Y_O + \frac{(Z_O - Z_C)Y_{D1}}{Z_{D1}} \\ Z_C \end{pmatrix}$$ (Formula 17)

[Mathematical Expression 18]

$$\begin{pmatrix} X_{PW2} \\ Y_{PW2} \\ Z_{PW2} \end{pmatrix} = \begin{pmatrix} X_O + \frac{(Z_O - Z_C)X_{D2}}{Z_{D2}} \\ Y_O + \frac{(Z_O - Z_C)Y_{D2}}{Z_{D2}} \\ Z_C \end{pmatrix}$$ (Formula 18)

[Mathematical Expression 19]

$$\begin{pmatrix} X_{PW3} \\ Y_{PW3} \\ Z_{PW3} \end{pmatrix} = \begin{pmatrix} X_O + \frac{(Z_O - Z_C)X_{D3}}{Z_{D3}} \\ Y_O + \frac{(Z_O - Z_C)Y_{D3}}{Z_{D3}} \\ Z_C \end{pmatrix}$$ (Formula 19)

$(X_{D0}, Y_{D0}, Z_{D0})$ of the formula 16, $(X_{D1}, Y_{D1}, Z_{D1})$ of the formula 17, $(X_{D2}, Y_{D2}, Z_{D2})$ of the formula 18, $(X_{D3}, Y_{D3}, Z_{D3})$ of the formula 19 in the above can be respectively obtained through the following formulas 20, 21, 22 and 23.

[Mathematical Expression 20]

$$\begin{pmatrix} X_{D0} \\ Y_{D0} \\ Z_{D0} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -W \\ -H \\ f \end{pmatrix}$$ (Formula 20)

[Mathematical Expression 21]

$$\begin{pmatrix} X_{D1} \\ Y_{D1} \\ Z_{D1} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} W \\ -H \\ f \end{pmatrix}$$ (Formula 21)

[Mathematical Expression 22]

$$\begin{pmatrix} X_{D2} \\ Y_{D2} \\ Z_{D2} \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} -W \\ H \\ f \end{pmatrix}$$ (Formula 22)

-continued

[Mathematical Expression 23]

$$\begin{pmatrix} X_{D3} \\ Y_{D3} \\ Z_D \end{pmatrix} = \begin{pmatrix} R_{00} & R_{01} & R_{02} \\ R_{10} & R_{11} & R_{12} \\ R_{20} & R_{21} & R_{22} \end{pmatrix} \begin{pmatrix} M_{00} & M_{01} & M_{02} \\ M_{10} & M_{11} & M_{12} \\ M_{20} & M_{21} & M_{22} \end{pmatrix} \begin{pmatrix} W \\ H \\ f \end{pmatrix} \quad \text{(Formula 23)}$$

An area consisting of each point of the four corners of the imaging area projected on the actual space area 2110, which is this $Z_W = Z_C$.

From the calculation method explained up to this point, it is possible to obtain an installation location and an installation direction of a camera, and moreover a location of a shooting area 2111 from a rotation angle of the camera.

Up to this point, the monitoring system related to the present invention is explained based on the first to fourth embodiments and their variations, and so on. However, the present invention is not limited to these embodiments. Any form of a variation that a concerned party may think of from each of the embodiments is also included in the present invention as long as it is not deviated from a range of major points of the present invention. Also, any form that is realized through a combination of components from each of the embodiment is also included in the present invention.

Figure 35:
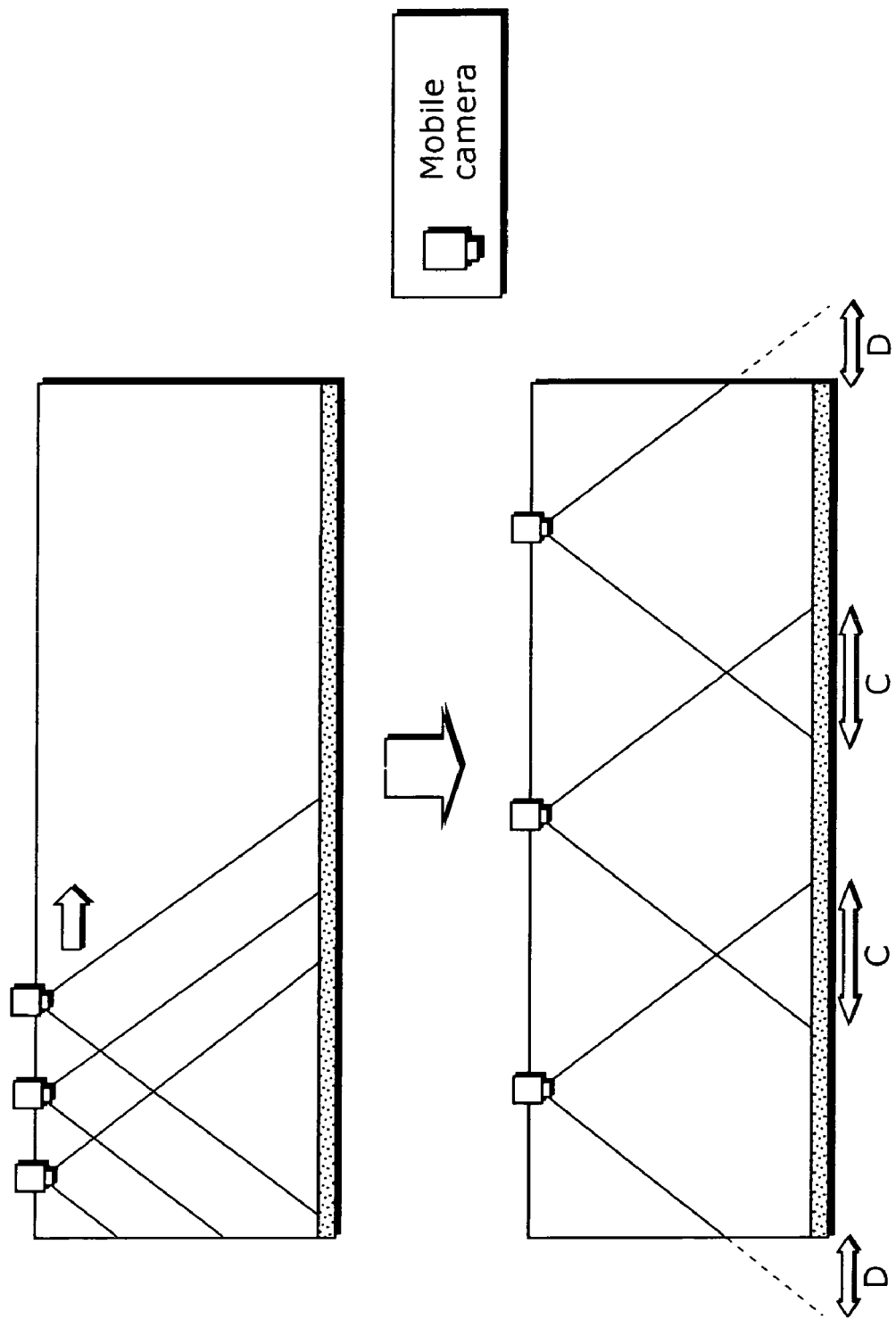
FIG. 35 is a diagram to show a monitoring system structured from a mobile camera.

In the above embodiments, the camera terminal is fixed at a ceiling, and so on of a building. However, the present invention can be realized not only with such a fixed type of the camera terminal, but also with a portable camera terminal as shown in FIG. 35. In FIG. 35, an example that a portable camera that can laterally move (one-dimensional) is installed at a ceiling of the room and monitors a floor is shown, however it may be a camera that can move two-dimensionally or three-dimensionally. As a control for the camera at that time, a moving control in a horizontal direction or/and a vertical direction may be conducted in addition to pan, tilt and zooming. For example, a pan angle is fixed, and a moving control in a horizontal direction (or a vertical direction) may be executed instead of a pan control so that it may be applied to the moving camera without largely changing the controlling method in the above embodiments.

Figure 36A:
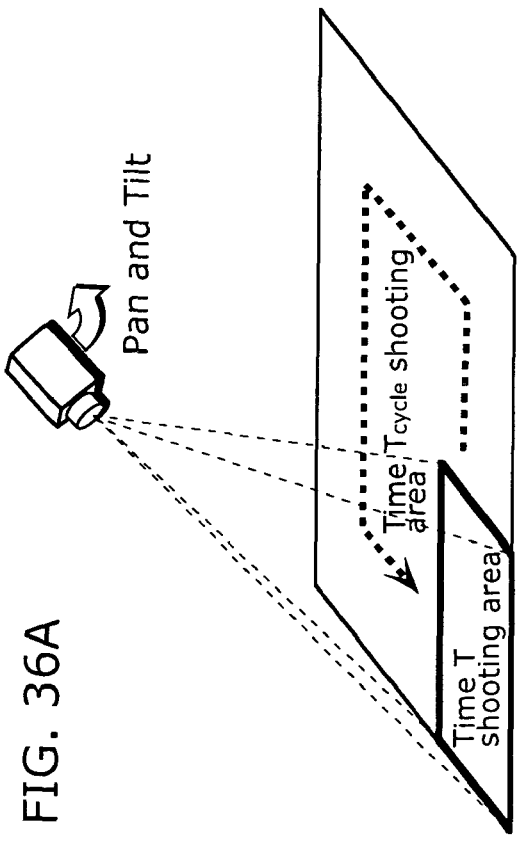
FIGS. 36A and 36B are an explanatory diagram of a cycle $T_{CYCLE}$ shooting area.
Figure 36B:
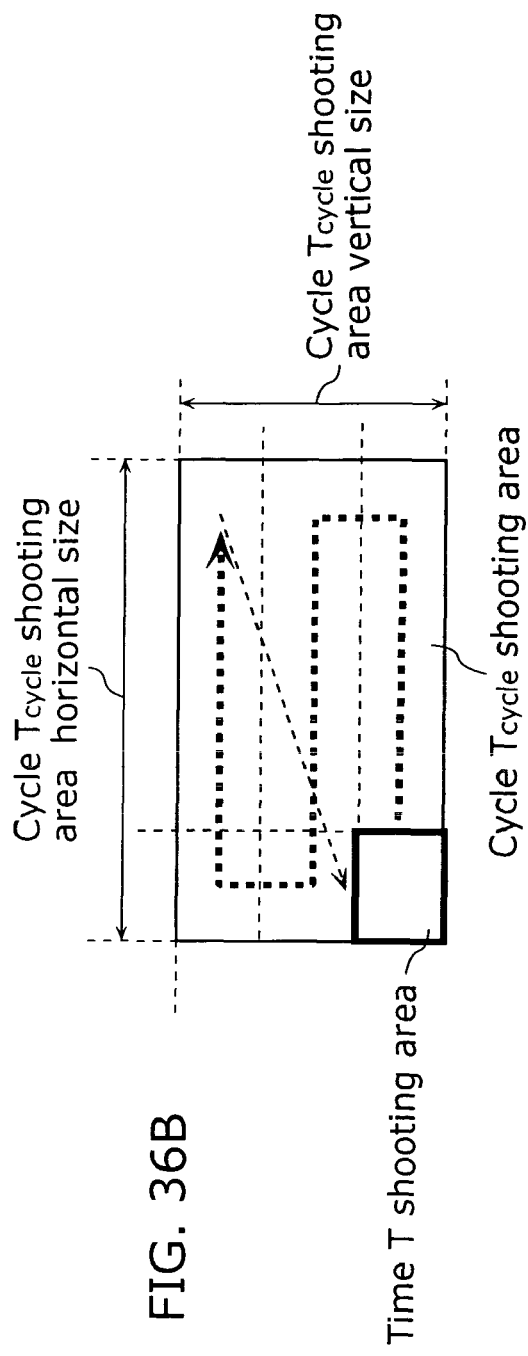

Also, in the above embodiments, the shooting area of each camera terminal is an area that a camera terminal shoots at a certain time T. However, the present invention may handle a whole area scanned and shot by the camera terminal within a certain time period (for example, the cycle $T_{CYCLE}$) as a shooting area in the above embodiments. For example, as shown in FIG. 36 A or FIG. 36 B, when the shooting area at the time T of the camera terminal is set as a time T shooting area and the camera terminal repeats an action to scan and shoot a certain area (a cycle $T_{CYCLE}$ shooting area) in the cycle $T_{CYCLE}$, this cycle $T_{CYCLE}$ shooting area can be treated as a shooting area in the above embodiment. In this case, it may or may not be depended on the cycle $T_{CYCLE}$ as the shooting area resolution. If it is depended on it, a new formula, which the cycle $T_{CYCLE}$ is incorporated into the formula 2, may be defined in order to make, for example, the resolution get worse as the cycle becomes bigger.

Correspondency of composing elements in the claims and the embodiments is as follows. In short, "camera controlling unit", "communication interface", "processing unit", "storage unit", and "preset information selecting unit" in the claims respectively correspond to the camera controlling unit 107, the communication IF 103, the processing unit 104, 104a~104c, the storage unit 105, 105a~105c, and a processing unit having the same function as the resolution weight map selecting unit 116 in the embodiments. Other composing elements in the claims correspond to composing elements having the same name in the embodiments.

The present invention is effective as a camera and a monitoring system using the camera, for example, as a monitoring system for a suspicious person at a school, a building, and so on, as a monitoring system for a public place like a wide range shooting system for shooting an intersection and a park, and so on and additionally as an internal remote monitoring system that monitors a situation within a home using plural network cameras, and so on, and especially as a high functional monitoring system that needs to maintain an entire area subject to monitoring to be shot thoroughly while it shoots an important location as a detailed image with higher resolution than its surrounding location for an area subject to monitoring of which importance of monitoring is different per location.

The invention claimed is:

1. A monitoring system that monitors an area subject to monitoring, said monitoring system comprising a plurality of camera terminals,
    wherein a self camera terminal of said plurality of camera terminals includes:
        a camera having a function for adjusting a shooting area of said self camera terminal;
        a camera controlling unit operable to control the adjusting of the shooting area of said self camera terminal;
        a communication interface for communicating with another camera terminal of said plurality of camera terminals; and
        a processing unit operable to adjust a resolution of the shooting area of said self camera terminal by controlling, via said camera controlling unit, said camera, so as to reduce a difference between a weighted resolution of the shooting area of said self camera terminal and the weighted resolution of a shooting area of said other camera terminal, based on information related to the shooting area of said other camera terminal obtained from said other camera terminal via said communication interface, the weighted resolution being defined as a degree in which (i) a resolution of a highly important shooting area becomes higher, and (ii) a resolution of a less important shooting area becomes lower,
    wherein, said monitoring system further comprises a first storage unit that holds a resolution weight map, the resolution weight map identifying a resolution weight of importance corresponding to each small area of a plurality of small areas of the area subject to monitoring, the plurality of small areas being obtained by dividing the area subject to monitoring,
    wherein said processing unit is operable to determine the weighted resolution by specifying the resolution weight of importance corresponding to the shooting area of said self camera terminal with reference to the resolution weight map held in said first storage unit, and operable to adjust the resolution of the shooting area of said self camera terminal,
    wherein said first storage unit is further operable to store a plurality of the resolution weight maps and a resolution weight selection list defining a rule for selecting one resolution weight map of the plurality of stored resolution weight maps based on a monitoring situation, and
    wherein said processing unit is further operable to (i) specify the monitoring situation, (ii) select a resolution weight map, of the plurality of resolution weight maps, corresponding to the specified monitoring situation, based on the rule defined in the resolution weight selection list, and (iii) specify, from the selected resolution weight map, the resolution weight of importance corresponding to the shooting area of said self camera terminal.

2. The monitoring system according to claim 1, wherein said processing unit is further operable to adjust a location of the shooting area of said self camera terminal in relation to the shooting area of said other camera terminal, which is adjacent to the shooting area of said self camera terminal, so as to thoroughly cover the area subject to monitoring, while making the shooting area of said self camera terminal be adjacent to the shooting area of said other camera terminal by controlling said camera via said camera controlling unit.

3. The monitoring system according to claim 2, wherein said processing unit is operable to adjust the location of the shooting area of said self camera terminal, such that the shooting area of said self camera terminal and the shooting area of said other camera terminal become adjacent and have a certain amount of overlap.

4. The monitoring system according to claim 1, wherein the weighted resolution is obtained by multiplying, in advance, the resolution of a shooting area of a camera terminal of said plurality of camera terminals by a resolution weight of importance corresponding to the shooting area of said camera terminal.

5. The monitoring system according to claim 1,
wherein the rule is defined in the resolution weight selection list for selecting the one resolution weight map, of the plurality of the resolution weight maps, according to a date and a time of shooting by said self camera terminal, and
wherein said processing unit is operable to specify the date and the time of shooting by said self camera terminal, and operable to select the resolution weight map, of the plurality of resolution weight maps, corresponding to the specified date and time, based on the rule defined in the resolution weight selection list.

6. The monitoring system according to claim 1,
wherein said monitoring system further comprises a second storage unit storing (i) a template image defining a characteristic of a specific target object, and (ii) a template image list identifying a resolution weight of importance corresponding to the template image, and
wherein said processing unit is further operable to (i) determine, for an image shot by said camera, an existence of a target object similar to the template image stored in said second storage unit, (ii) specify the resolution weight of importance corresponding to the template image by referring to the template image list, when the target object is determined to exist, (iii) determine the specified resolution weight of importance to be the weighted resolution of the shooting area of said self camera terminal, and (iv) adjust the resolution of the shooting area of said self camera terminal.

7. The monitoring system according to claim 1, wherein said processing unit includes:
a shooting area deciding unit operable to specify a location of the shooting area of said self camera terminal;
a resolution weight deciding unit operable to specify a resolution weight of importance corresponding to the location of the shooting area, of said self camera terminal, specified by said shooting area deciding unit;
a communication unit operable to (i) transmit, to said other camera terminal via said communication interface, the location of the shooting area, of said self camera terminal, specified by said shooting area deciding unit and the resolution weight of importance corresponding to the location of the shooting area, of said self camera terminal, specified by said resolution weight deciding unit, and (ii) control said communication interface to receive a location of the shooting area of said other camera terminal from said other camera terminal and the resolution weight of importance corresponding to the location of the shooting area of said other camera terminal;
an adjacent area deciding unit operable to specify a shooting area, which is adjacent to the shooting area of said self camera terminal, based on the location of the shooting area of said other camera terminal received by said communication interface and the location of the shooting area of said self camera terminal specified by said shooting area deciding unit;
a resolution adjusting unit operable to adjust the resolution of the shooting area of said self camera terminal by controlling a size of the shooting area of said camera, via said camera controlling unit, so as to reduce the difference between the weighted resolution of the shooting area of said self camera terminal and the weighted resolution of the shooting area of said other camera terminal specified by said adjacent area deciding unit, based on (i) the location of the shooting area of said other camera terminal received via the said communication interface, (ii) the resolution weight of importance corresponding to the location of the shooting area of said other camera terminal, and (iii) the resolution weight of importance corresponding to the location of the shooting area of said self camera terminal specified by said resolution weight deciding unit; and
a shooting area adjusting unit operable to adjust the location of the shooting area of said self camera terminal by adjusting the location of the shooting area of said camera via said camera controlling unit to have the specified location of the shooting area of said self camera terminal and the specified shooting area be adjacent, based on the location of the shooting area of said self camera terminal specified by said shooting area deciding unit and the shooting area specified by said adjacent area deciding unit.

8. The monitoring system according to claim 1,
wherein each camera terminal of said plurality of camera terminals includes a respective camera, a respective camera controlling unit, a respective communication interface, and a respective processing unit, and
wherein each respective camera terminal of said plurality of camera terminals adjusts a focal distance of said respective camera to adjust the resolution of the shooting area of said respective camera terminal.

9. A monitoring system that monitors an area subject to monitoring, said monitoring system comprising a plurality of camera terminals,
wherein a self camera terminal of said plurality of camera terminals includes:
a camera having a function for adjusting a shooting area of said self camera terminal;
a camera controlling unit operable to control the adjusting of the shooting area of said self camera terminal;
a communication interface for communicating with another camera terminal of said plurality of camera terminals; and
a processing unit operable to adjust a resolution of the shooting area of said self camera terminal by controlling, via said camera controlling unit, said camera, so as to reduce a difference between a weighted resolution of the shooting area of said self camera terminal and the weighted resolution of a shooting area of said other camera terminal, based on information related to the shooting area of said other camera terminal obtained from said other camera terminal via said communication interface, the weighted resolution being defined as a degree in which (i) a resolution of a highly important shooting area becomes higher, and (ii) a resolution of a less important shooting area becomes lower, wherein said camera terminal further includes a third storage unit storing a resolution weight map creation rule defining a rule for creating a resolution weight map, the resolution weight map identifying a resolution weight of importance corresponding to each small area of a plurality of small areas of the area subject to monitoring, the plurality of small areas being obtained by dividing the area subject to monitoring based on an image shot by said camera, wherein said processing unit is operable to (i) create the resolution weight map from the image shot by said camera according to the resolution weight map creation rule stored in said third storage unit, (ii) determine the weighted resolution of the shooting area of said self camera terminal by specifying, from the created resolution weight map, a resolution weight of importance corresponding to the shooting area of said self camera terminal, and (iii) adjust the resolution of the shooting area of said self camera terminal, wherein said third storage unit is further operable to store a template image defining a characteristic of a specific target object, wherein the resolution weight map creation rule defines, according to a ratio of time for a specific target object to exist at a discretional location, a rule for deciding the resolution weight of importance at the discretional location, and wherein said processing unit is operable to (i) determine, for the image shot by said camera, an existence of a target object similar to the template image stored in said third storage unit, (ii) specify the ratio of time for the specific target object to exist at the discretional location, and (iii) create the resolution weight map that identifies the resolution weight of importance corresponding to the specified ratio as the resolution weight of importance at the discretional location.

10. A monitoring method of using a monitoring system to monitor an area subject to monitoring, the monitoring system including a plurality of camera terminals for monitoring the area subject to monitoring, said monitoring method comprising:

a step of adjusting a resolution of a shooting area of a self camera terminal of the plurality of camera terminals by controlling a camera of the self camera terminal via a camera controlling unit of the self camera terminal to reduce a difference between a weighted resolution of the shooting area of the self camera terminal and the weighted resolution of a shooting area of another camera terminal of the plurality of camera terminals, based on information related to the shooting area of the other camera terminal obtained from the other camera terminal via communication between the self camera terminal and the other camera terminal, the weighted resolution being defined as a degree in which (i) a resolution of a highly important shooting area becomes higher, and (ii) a resolution of a less important shooting area becomes lower, wherein, the monitoring system further comprises a first storage unit that holds a resolution weight map, the resolution weight map identifying a resolution weight of importance corresponding to each small area of a plurality of small areas of the area subject to monitoring, the plurality of small areas being obtained by dividing the area subject to monitoring, wherein said monitoring method includes a step of determining the weighted resolution by specifying the resolution weight of importance corresponding to the shooting area of the self camera terminal with reference to the resolution weight map held in the first storage unit, and adjusting the resolution of the shooting area of the self camera terminal, wherein the first storage unit stores a plurality of the resolution weight maps and a resolution weight selection list defining a rule for selecting one resolution weight map of the plurality of stored resolution weight maps based on a monitoring situation, wherein said step of adjusting the resolution further includes (i) specifying the monitoring situation, (ii) selecting a resolution weight map, of the plurality of resolution weight maps, corresponding to the specified monitoring situation, based on the rule defined in the resolution weight selection list, and (iii) specifying, from the selected resolution weight map, the resolution weight of importance corresponding to the shooting area of the self camera terminal.

11. A non-transitory computer-readable recording medium having a program recorded thereon, the program causing a computer to execute the monitoring method according to claim 10, wherein the program is for the self camera terminal of the monitoring system.

12. A camera terminal, of a monitoring system, having a shooting area adjustment function, said camera terminal comprising:

a camera controlling unit operable to control an adjustment of a shooting area of said camera terminal;

a communication interface for communicating with another camera terminal; and a processing unit operable to adjust a resolution of the shooting area of said camera terminal by controlling said camera terminal via said camera controlling unit to reduce a difference between a weighted resolution of the shooting area of said camera terminal and the weighted resolution of a shooting area of the other camera terminal, based on information related to the shooting area of the other camera terminal obtained from the other camera terminal via said communication interface, the weighted resolution being defined as a degree in which (i) a resolution of a highly important shooting area becomes higher, and (ii) a resolution of a less important shooting area becomes lower, wherein, the monitoring system includes a first storage unit that holds a resolution weight map, the resolution weight map identifying a resolution weight of importance corresponding to each small area of a plurality of small areas of the area subject to monitoring, the plurality of small areas being obtained by dividing the area subject to monitoring, wherein said processing unit is operable to determine the weighted resolution by specifying the resolution weight of importance corresponding to the shooting area of said camera terminal with reference to the resolution weight map held in the first storage unit, and operable to adjust the resolution of the shooting area of said camera terminal, wherein the first storage unit is further operable to store a plurality of the resolution weight maps and a resolution weight selection list defining a rule for selecting one resolution weight map of the plurality of stored resolution weight maps based on a monitoring situation, and wherein said processing unit is further operable to (i) specify the monitoring situation, (ii) select a resolution weight map, of the plurality of resolution weight maps, corresponding to the specified monitoring situation, based on the rule defined in the resolution weight selection list, and (iii) specify, from the selected resolution weight map, the resolution weight of importance corresponding to the shooting area of said camera terminal.

* * * * *